(12) United States Patent
Mok et al.

(10) Patent No.: US 8,057,134 B2
(45) Date of Patent: Nov. 15, 2011

(54) CHUCK ASSEMBLY

(75) Inventors: Kwok Ting Mok, Tokwawan (HK); Kok Vui Lai, Shatin (HK)

(73) Assignee: Techtronic Power Tools Technology Limited, Tortola (VG)

( * ) Notice: Subject to any disclaimer, the term of this patent is extended or adjusted under 35 U.S.C. 154(b) by 1052 days.

(21) Appl. No.: 11/768,509

(22) Filed: Jun. 26, 2007

(65) Prior Publication Data
US 2009/0003949 A1    Jan. 1, 2009

(51) Int. Cl.
*B23B 31/10* (2006.01)
*B23B 31/16* (2006.01)
(52) U.S. Cl. ........... 408/124; 408/240; 279/62; 279/902
(58) Field of Classification Search .................. 408/124, 408/240; 279/60–62, 902; B23B 31/10
See application file for complete search history.

(56) References Cited

U.S. PATENT DOCUMENTS

| 896,051 | A | 8/1908 | Ashley |
|---|---|---|---|
| 1,513,332 | A | 10/1924 | McConnell |
| 3,000,642 | A | 9/1961 | Kawasaki |
| 4,078,589 | A | 3/1978 | Miller |
| 4,260,169 | A | 4/1981 | Hall |
| 4,292,571 | A * | 9/1981 | Cuneo ............................. 318/17 |
| 4,456,270 | A | 6/1984 | Zettl, Jr. et al. |
| 4,660,841 | A | 4/1987 | Chouinard |
| 4,682,918 | A | 7/1987 | Palm |
| 4,703,941 | A | 11/1987 | Rohm |
| 4,754,669 | A | 7/1988 | Verdier et al. |
| 4,804,048 | A | 2/1989 | Porth, Jr. |
| 4,951,955 | A | 8/1990 | Sakamaki |
| 4,986,369 | A | 1/1991 | Fushiya et al. |
| 5,025,903 | A | 6/1991 | Elligson |
| 5,036,925 | A | 8/1991 | Wache |
| 5,044,643 | A | 9/1991 | Nakamura |
| 5,072,954 | A | 12/1991 | Mack |
| 5,125,673 | A | 6/1992 | Huff et al. |
| 5,174,588 | A | 12/1992 | Reibetanz et al. |
| 5,207,697 | A | 5/1993 | Carusillo et al. |
| 5,253,879 | A | 10/1993 | Huff et al. |
| 5,277,527 | A | 1/1994 | Yokota et al. |
| 5,343,961 | A | 9/1994 | Ichikawa |
| 5,348,317 | A | 9/1994 | Steadings et al. |
| 5,348,318 | A | 9/1994 | Steadings et al. |
| 5,451,127 | A | 9/1995 | Chung |
| 5,452,906 | A | 9/1995 | Huff et al. |
| 5,501,473 | A | 3/1996 | Barton et al. |
| 5,553,873 | A | 9/1996 | Salpaka et al. |
| 5,573,254 | A | 11/1996 | Huff et al. |
| 5,588,496 | A | 12/1996 | Elger |

(Continued)

FOREIGN PATENT DOCUMENTS

CN    2302078 Y    12/1998

(Continued)

*Primary Examiner* — Eric A Gates
(74) *Attorney, Agent, or Firm* — Michael Best & Friedrich LLP

(57) ABSTRACT

A chuck assembly configured to provide a shorter longitudinal profile. The chuck assembly includes a chuck body with a support bearing mounted to a rear portion of the chuck body and mounted to a portion of a housing such that a cavity is defined axially rearward of the support bearing and is configured to receive the jaws when the rear portion of the jaws extend axially rearward.

21 Claims, 18 Drawing Sheets

U.S. PATENT DOCUMENTS

| | | | |
|---|---|---|---|
| 5,590,985 A | 1/1997 | Mack | |
| 5,709,392 A | 1/1998 | Barton et al. | |
| 5,716,057 A | 2/1998 | Wright, Jr. et al. | |
| 5,732,805 A | 3/1998 | Nakamura | |
| 5,738,469 A | 4/1998 | Hsu | |
| 5,765,839 A | 6/1998 | Rohm | |
| 5,788,021 A | 8/1998 | Tsai | |
| 5,820,134 A | 10/1998 | Subils Valls | |
| 5,829,762 A | 11/1998 | Claramunt et al. | |
| 5,882,153 A | 3/1999 | Mack et al. | |
| 5,927,914 A | 7/1999 | Mack et al. | |
| 5,984,022 A | 11/1999 | Harman, Jr. et al. | |
| 6,010,426 A | 1/2000 | Nakamura | |
| 6,045,141 A | 4/2000 | Miles et al. | |
| 6,056,298 A * | 5/2000 | Williams | 279/150 |
| 6,073,939 A | 6/2000 | Steadings et al. | |
| 6,142,243 A | 11/2000 | Mayer | |
| 6,176,801 B1 | 1/2001 | Chen | |
| 6,186,516 B1 | 2/2001 | Miles et al. | |
| 6,247,706 B1 * | 6/2001 | Kuo | 279/62 |
| 6,273,200 B1 | 8/2001 | Smith et al. | |
| 6,305,481 B1 | 10/2001 | Yamazaki et al. | |
| 6,311,988 B1 | 11/2001 | Wilson | |
| 6,338,404 B1 | 1/2002 | Chen | |
| 6,398,226 B1 | 6/2002 | Huggins et al. | |
| 6,402,160 B1 | 6/2002 | Grogan et al. | |
| 6,409,181 B1 | 6/2002 | Hsueh | |
| 6,428,018 B1 | 8/2002 | Aultman et al. | |
| 6,523,658 B2 | 2/2003 | Furtura et al. | |
| 6,536,782 B2 | 3/2003 | Rohm | |
| 6,595,300 B2 | 7/2003 | Milbourne | |
| 6,612,587 B2 | 9/2003 | Zhou | |
| 6,616,147 B2 | 9/2003 | Wilson | |
| 6,666,283 B2 | 12/2003 | Frauhammer et al. | |
| 6,676,557 B2 | 1/2004 | Milbourne | |
| 6,702,090 B2 | 3/2004 | Nakamura et al. | |
| 6,715,380 B2 | 4/2004 | Listl et al. | |
| 6,722,668 B2 | 4/2004 | Huggins et al. | |
| 6,729,812 B2 | 5/2004 | Yaksich et al. | |
| 6,736,410 B2 | 5/2004 | Barton et al. | |
| 6,776,244 B2 | 8/2004 | Milbourne | |
| 6,843,141 B2 | 1/2005 | Spielmann et al. | |
| 6,857,983 B2 | 2/2005 | Milbourne et al. | |
| 6,902,171 B2 | 6/2005 | Sakamaki et al. | |
| 6,991,238 B2 | 1/2006 | Yang | |
| 7,000,709 B2 | 2/2006 | Milbourne | |
| 7,008,151 B2 | 3/2006 | Yaksich et al. | |
| 7,021,400 B2 | 4/2006 | Oretti | |
| 7,048,107 B1 | 5/2006 | Geis | |
| 7,063,201 B2 | 6/2006 | Nakamura et al. | |
| 7,066,691 B2 | 6/2006 | Doyle et al. | |
| 7,137,761 B2 | 11/2006 | Hara et al. | |
| 7,178,216 B2 | 2/2007 | Sakamaki et al. | |
| 7,185,895 B2 | 3/2007 | Cachod et al. | |
| 7,185,896 B2 | 3/2007 | Cachod et al. | |
| 7,503,734 B2 * | 3/2009 | Puzio | 408/240 |
| 7,588,398 B2 * | 9/2009 | Puzio et al. | 408/124 |
| 2002/0130007 A1 | 9/2002 | Nakamura et al. | |
| 2004/0115525 A1 | 6/2004 | Kuo | |
| 2004/0217558 A1 | 11/2004 | Yang | |
| 2005/0023774 A1 | 2/2005 | Mack | |
| 2005/0023776 A1 | 2/2005 | Yang et al. | |
| 2006/0027979 A1 | 2/2006 | Yang et al. | |
| 2006/0038359 A1 | 2/2006 | Luckenbaugh | |
| 2006/0061048 A1 | 3/2006 | Puzio et al. | |
| 2006/0185870 A1 | 8/2006 | Gehret | |
| 2006/0186610 A1 | 8/2006 | Puzio | |
| 2006/0208435 A1 | 9/2006 | Rohm | |
| 2006/0211534 A1 | 9/2006 | Roberts et al. | |
| 2006/0213675 A1 | 9/2006 | Whitmire et al. | |
| 2006/0244223 A1 | 11/2006 | Zhou et al. | |
| 2006/0244224 A1 | 11/2006 | Zhou et al. | |
| 2006/0273529 A1 | 12/2006 | Zhou et al. | |
| 2007/0132196 A1 | 6/2007 | Puzio et al. | |
| 2007/0158086 A1 | 7/2007 | Puzio et al. | |
| 2007/0170664 A1 | 7/2007 | Puzio et al. | |
| 2007/0170665 A1 | 7/2007 | Puzio et al. | |
| 2007/0241519 A1 * | 10/2007 | Zhou et al. | 279/62 |
| 2008/0136124 A1 * | 6/2008 | Tan | 279/62 |
| 2009/0016834 A1 * | 1/2009 | Scrimshaw et al. | 408/139 |
| 2010/0200257 A1 * | 8/2010 | Scrimshaw et al. | 173/47 |

FOREIGN PATENT DOCUMENTS

| | | |
|---|---|---|
| CN | 2420103 Y | 2/2001 |
| CN | 2683290 Y | 3/2005 |
| DE | 10 227 983 C1 | 11/2003 |
| EP | 0 566 926 B1 | 12/1995 |
| EP | 1 410 879 B1 | 12/2006 |
| JP | 63-216603 | 9/1988 |

* cited by examiner

US 8,057,134 B2

CHUCK ASSEMBLY

FIELD OF THE INVENTION

The present invention relates to a drill and, in particular a drill having a compact chuck assembly.

BACKGROUND OF THE INVENTION

Typically, a drill has a chuck assembly that includes jaws that are displaced in passages between axially front and radially closely spaced positions and axially back and radially widely spaced positions. To accommodate the axial travel of the jaws, it has been known to make the chuck fairly long, which may make the drill harder to handle, while not contributing to the overall functionality of the drill.

The present invention provides a chuck assembly that allows the drill and the chuck assembly to be shorter than conventional drills and chuck assemblies.

SUMMARY OF THE INVENTION

The present invention includes a tool with a chuck assembly that includes a chuck body having an axial forward end and an axial rearward end, a thrust ledge extending radially outward from the chuck body; and a support bearing having an inner periphery mounted to the chuck body and having an outer periphery mounted to a housing of the tool, wherein jaws extending axially rearward can extend into a cavity defined within the housing and located axially rearward of the support bearing. In certain aspects of the invention, the tool can include a clutch mechanism. In other aspects of the invention, the tool can include a spindle lock mechanism that, when actuated, prevents the chuck body from rotating with respect to the housing. In other aspects of the present invention, the tool claim can include a clutch override mechanism that is operable in any setting of the clutch mechanism.

DETAILED DESCRIPTION OF THE EMBODIMENTS

Figure 1:
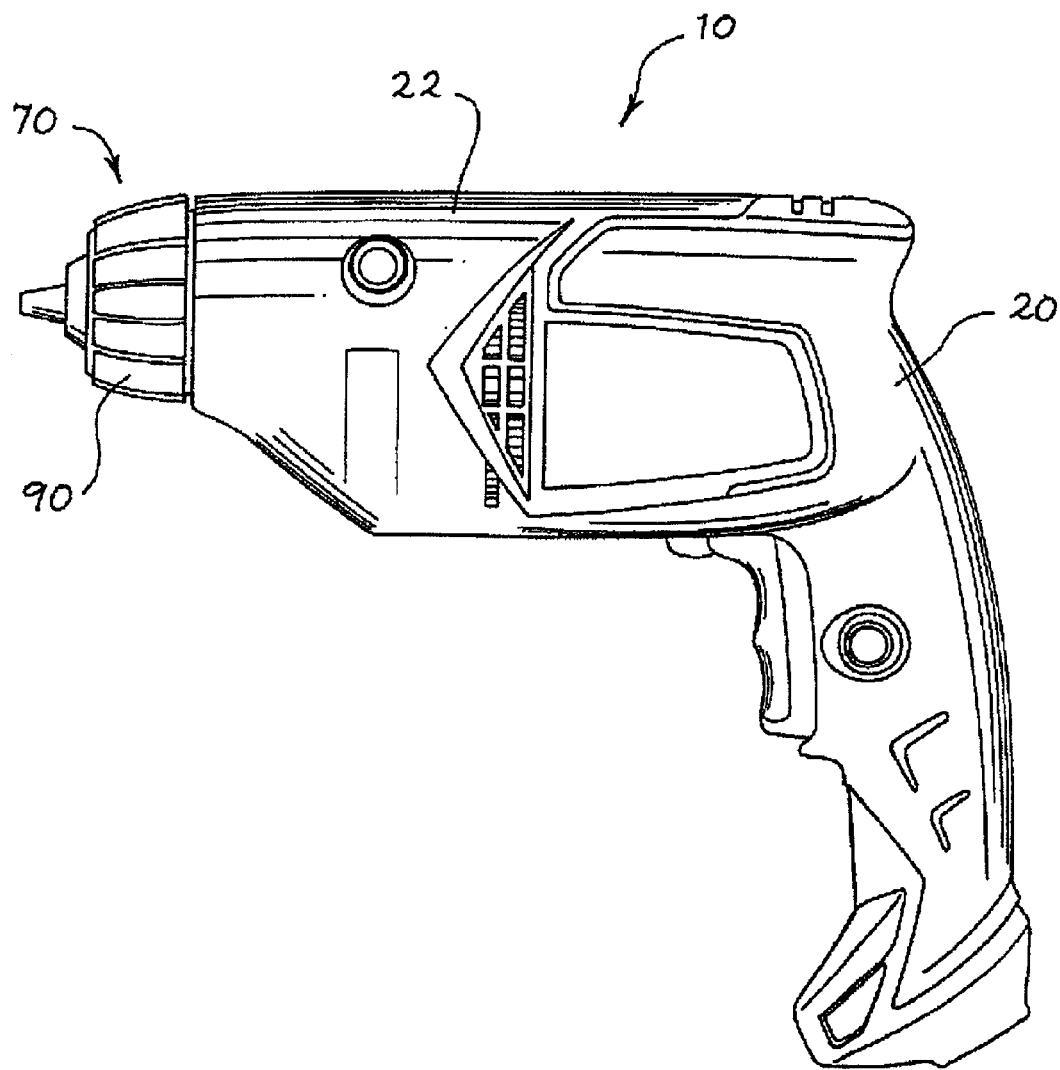
FIG. 1 is a side perspective view of one embodiment of a drill that incorporates a chuck assembly according to the present invention.

Turning now to FIG. 1, a tool 10 utilizing the chuck assembly 70 according to the present invention is shown. The tool 10 has a housing 20 generally formed in two parts 22, 24 that are joined to each to form an enclosure for the several parts of the tool 10. The tool 10 shown in FIG. 1 is a hand held drill and is powered by an electrical cord (not shown). One of skill in the art will understand that the chuck assembly 70 of the present invention can be used with a number of different tools but for ease of description, it will be described in connection with a drill. For example, the tool could be a screwdriver, a grinder, or a router, etc. The tool 10 is typically driven by a motor 30 that is powered from an electrical source that can include a hard wire, batteries, or both. Such tools and motors are conventional and therefore a further discussion is not warranted or necessary.

Figure 2:
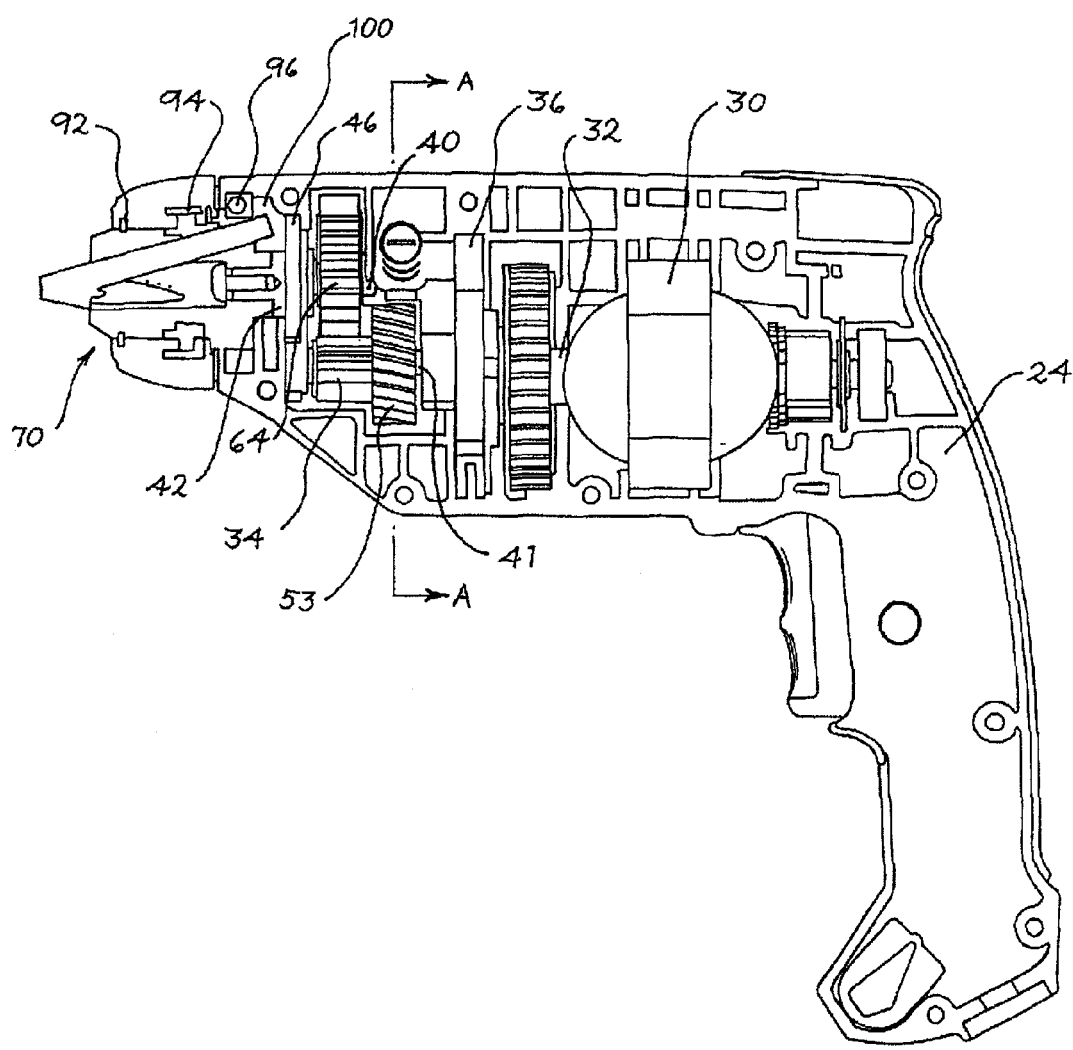
FIG. 2 is a cross sectional view of another embodiment of a drill (a corded drill) that illustrates a chuck assembly according to the present invention.
Figure 3:
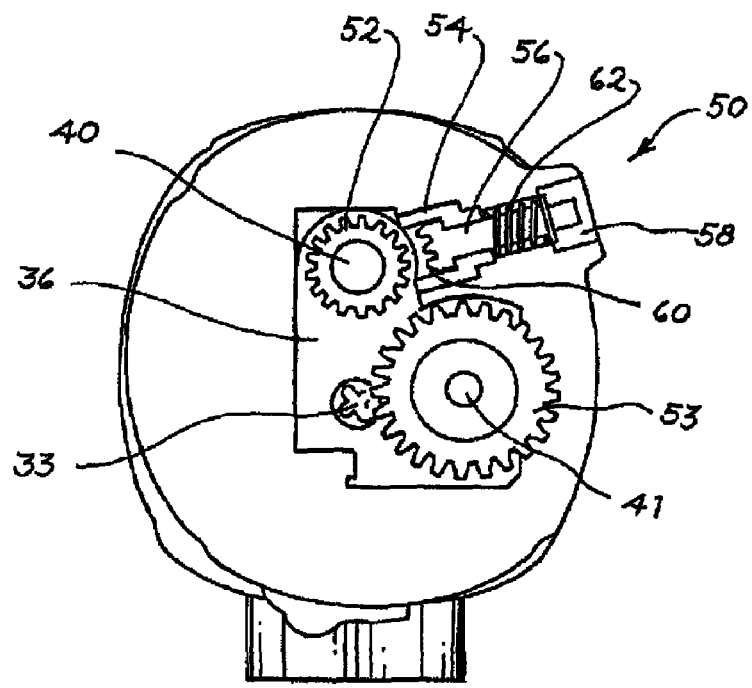
FIG. 3 is a cross sectional view of the drill of FIG. 2 along line A-A.

FIG. 2 shows a cross sectional view of the tool 10 of FIG. 1. It is understood that the half of the housing not shown 22 will mate with the half 24 that is shown. The drill includes a motor 30 with an output shaft 32 that carries an output shaft gear 33 at a distal end of the output shaft 32. The output shaft 32 is rotatably supported by a gearing support 36. The output shaft 32 drives a first gear 53 via a pinion. The first gear 53 and the second gear 34 are fixed on the first shaft 41. The second gear 34 drives the spindle 40 via spindle driving gear 64. The spindle 40 has a first end 42 that is rotatably supported by a journal 46. The first end 42 is attached to a chuck body 74. Alternatively, the spindle 40 may be monolithic with the chuck body 74. The other, opposite second end 44, is supported by the gearing support 36. A spindle lock gear 52 is non-rotatably provided on the spindle 40 near the second end 44. The spindle lock gear 52 can be selectively engaged by a spindle lock mechanism 50, as best seen in FIG. 3. In this regard, the gearing support 36 is fixed within the tool housing 20. The tool housing 20 carries a spindle lock mechanism 50 that includes a guide 54 for a lock shaft 56. A head 58 of the lock shaft 56 extends from the guide 54 and the tool housing 20 so that it is accessible to the user. The other, opposite end, is provided with teeth 60 or other features to engage the spindle lock gear 52. A biasing mechanism 62, generally in the form of a spring, is disposed between the head 58 of the lock shaft and the guide 54 to bias the lock shaft 59 outward or in a non-locking position. To selectively lock the spindle 40 from rotating, the head 58 of the lock shaft is depressed or moved toward the tool housing 20 until the opposite end 60 contacts or engages the spindle lock gear 52. When the spindle 40 is locked, the chuck outer sleeve 90 can be rotated to loosen or tighten the jaws 82 of the chuck.

A spindle driving gear 64 is fixedly provided on the spindle 40 between the first end 42 and the second end 44 of the spindle 40. In general, the spindle driving gear 64 may be provided axially forward of the spindle lock gear 52. The output shaft 32 drives the first gear 53 via pinion 33 so to that the second gear 34 drives the spindle 40 via the spindle driving gear 64. The spindle driving gear 64 engages the output shaft gear 34. When the spindle lock mechanism 50 is not engaged, rotation of the output shaft gear 34 (such as when the motor 30 causes the output shaft 32 to rotate) causes the spindle 40 to rotate. The spindle 40 is sized such that it does not extend axially forward of the housing 20. In other words, the spindle 40 has an axial length such that the first end of the spindle 42 does not extend axially forward of the housing 20.

Figure 4:
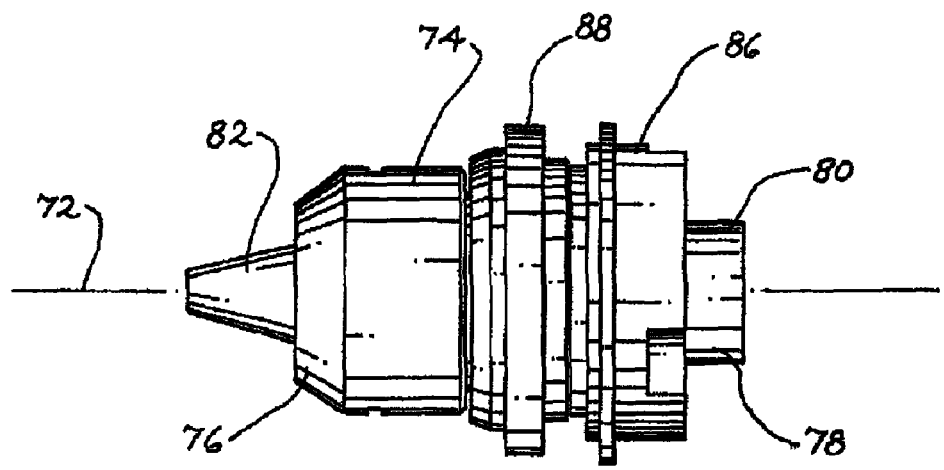
FIG. 4 is a side view of a chuck body according to one embodiment of the present invention.

As noted above, the first end of the spindle 42 is connected to the chuck body 74. Turning now to FIG. 4, one embodiment of the chuck body 74 useful in the chuck assembly 70 of the present invention is shown. The chuck assembly 70 defines a longitudinal axis 72 along which the chuck body 74 has an axial forward end 76 and axial rear end 78. The axial forward end 76 has an axial opening through which jaws 82 that are capable of gripping the shaft of a work tool extend. The jaws 82 are mounted within bores 84 angularly positioned through the body 74 and equally spaced throughout the body 74. An adjustment ring or nut 88 is mounted within a groove in the body 74 and it includes threads that engage corresponding threads on the jaws. As a result, when the adjustment ring or nut 88 rotates with respect to the body 74, the jaws 82 move in a corresponding axially forward or rearward direction.

An outer sleeve 90 is rotatably mounted about the body 74 and is axially fixed with respect to the body 74. As seen in FIG. 2, the outer sleeve 90 may be axially fixed by a ring 92 that is axially fixed to the chuck body 74 yet allows the outer sleeve 90 to rotate with respect to the body 74. The outer sleeve 90 extends axially rearward toward the tool housing 20. In one aspect, the outer sleeve does not extend axially rearward beyond the support bearing 96.

The outer sleeve 90 is operatively connected with the adjustment ring or nut 88 so that rotation of the outer sleeve 90 causes a corresponding rotation of the adjustment ring or nut 88 in the same direction as the rotation of the outer sleeve 90. The outer sleeve 90 may be operatively connected in a variety of known means so long as rotation of the outer sleeve 90 causes rotation of the adjustment ring or nut 88. For example, the outer sleeve 90 may be connected to a nut sleeve 94, which in turn, is connected to the nut 88 so that as the outer sleeve 90 is rotated with respect to the body 74, the nut 88 will likewise be rotated.

Figure 5:
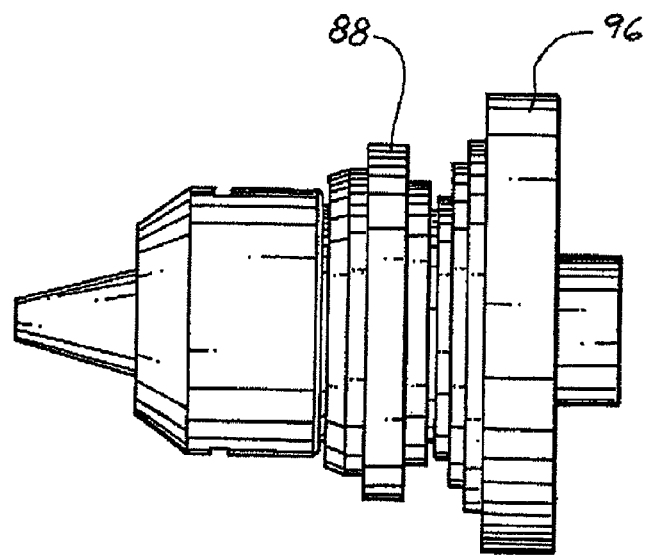
FIG. 5 is a side view of the chuck body of FIG. 4 with a bearing located axially rearward of the nut on the chuck body.
Figure 6:
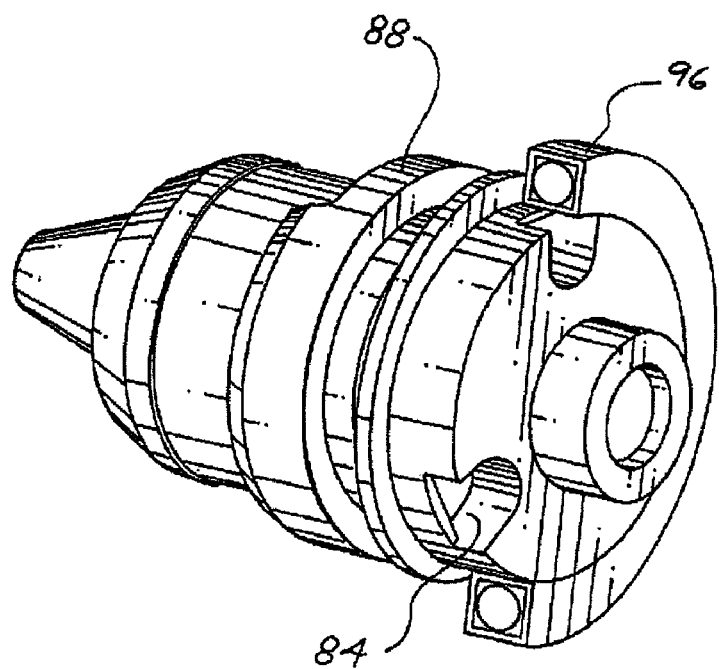
FIG. 6 is a side perspective view of the chuck body of FIG. 5 with a portion of the bearing being cutaway.
Figure 7:
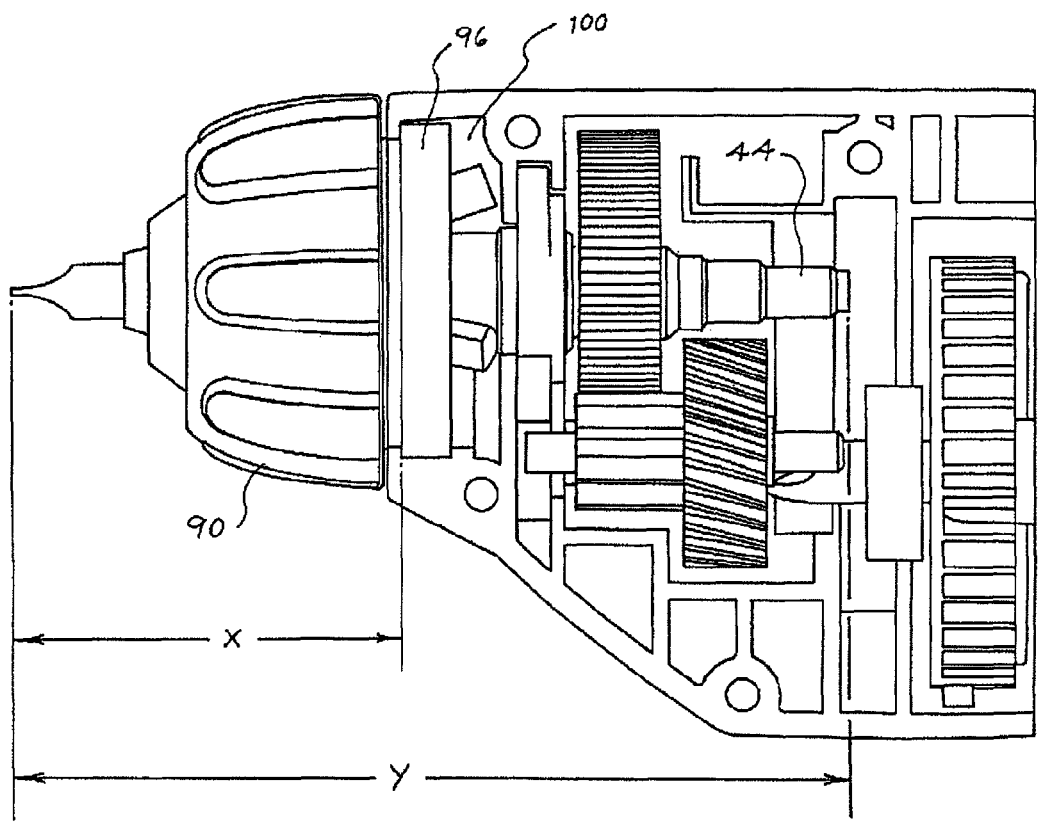
FIG. 7 is a detail view of the drill of FIG. 2.

The chuck body 74 has a support ledge 86 that extends radially from the body 74. The nut 88 is located axially forward of the support ledge 86. Axially rearward of the ledge 86, a support bearing structure 96 is press fit onto the chuck body 74 as shown in FIGS. 5 and 6. The support bearing structure 96 is axially fixed within the housing 20 so that chuck body 74 is axially fixed but rotatable. A cavity or annular space 100 is defined between the support bearing structure 96 on the chuck body 74 and the journal 46 for the spindle 40. The annular space 100 is sized to accommodate the jaws 82 when they are in an axially rearward position. The annular space 100 allows the axial length of the chuck body 74 to be reduced. As a result, the overall length of the drill can be shorter. In addition, the length of the spindle 40 can be reduced, which may reduce any bending or vibration. It is also likely that drill chuck runout may be prevented or minimized. As illustrated in FIG. 7, the distance between the axially forward support for the chuck to the load (i.e., the axial forward end of the workpiece) is indicated as X. The distance between the axially rearward support for the spindle (or in the case of a monolithic tail of the chuck body) and the load (i.e., the axial forward end of the workpiece) is indicated as Y. Desirably, the ratio of X to Y should be as small as possible to minimize runout. In certain embodiments, the ratio is 0.5 or less.

Figure 8:
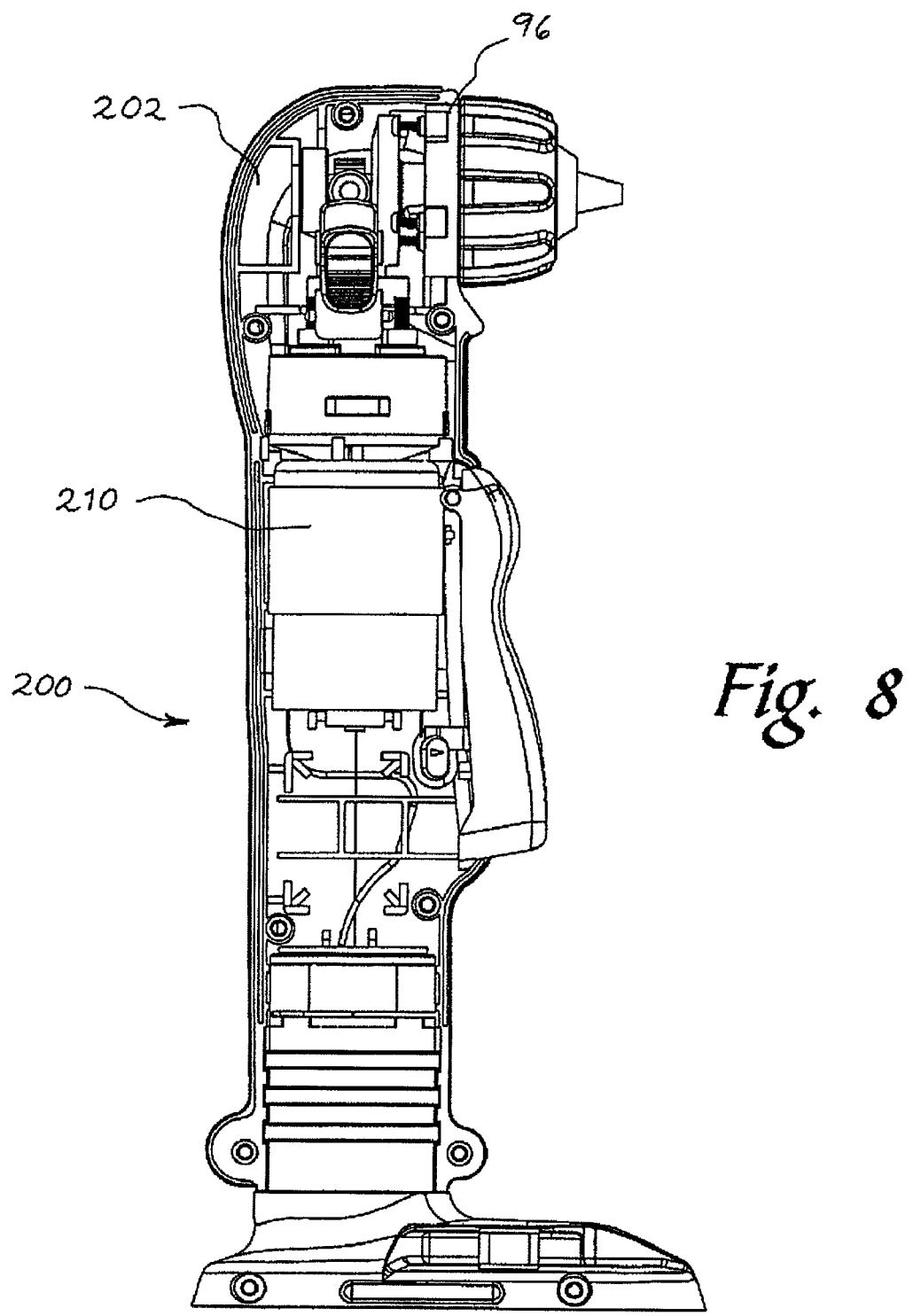
FIG. 8 shows a partially cut away view of a right angle drill that incorporates the chuck assembly of the present invention.

As noted above, the chuck assembly 70 may be used with tools other than a drill. Accordingly, FIG. 8 shows a right angle drill 200 that incorporates the features of the chuck assembly 70 described above. In particular, the chuck body 74 has a support bearing 96 a portion of which is fixed to the body 74 and another portion of which is axially fixed to the housing 202 so that the chuck body 74 can rotate with respect to the housing 202.

Figure 10:
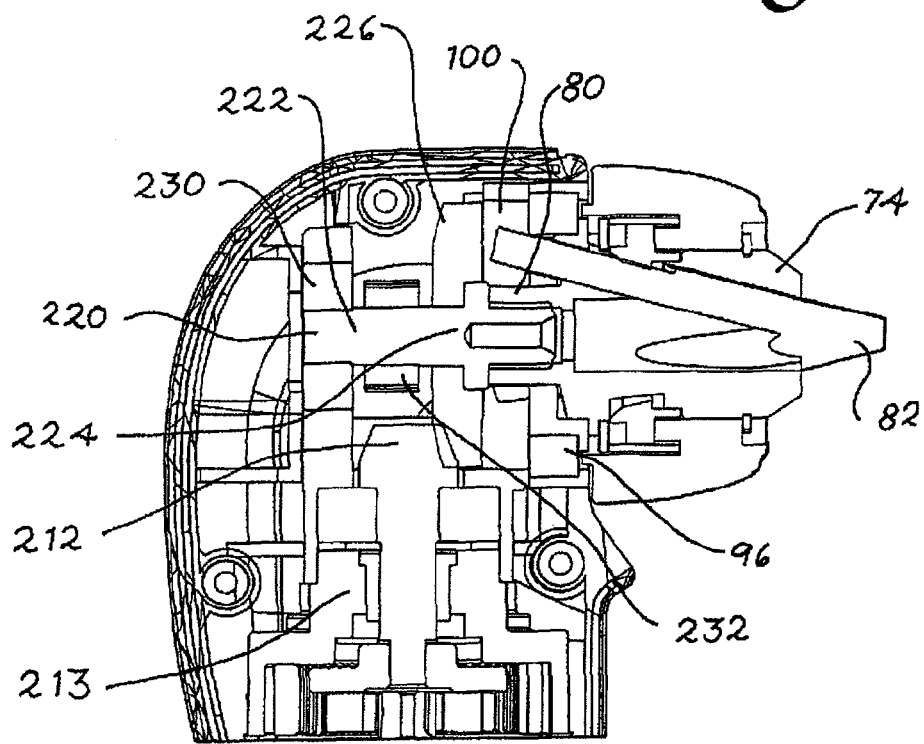
FIG. 10 is a cross sectional view of a chuck assembly according to the present invention where the chuck body has a monolithic tail functioning as the main drive shaft in a right angle drill.

As shown in FIG. 10, the spindle 220 is oriented perpendicular to a motor 210 that drives an output gear 212 through a planetary gear set (not shown) located within a planetary gear housing 213. One end of the spindle 222 is rotatably supported by a journal 230 and the other end 224 is connected to the chuck body 74. A spindle drive gear 226 is disposed between the two ends 222, 224 of the spindle 220 and engaged by the output gear 212. As a result, when the output gear 212 rotates (such as from rotation caused by the motor 210), the chuck body 74 rotates. The spindle gear 226 is spaced from the support bearing 96 to define a cavity 240 into which the jaws 82 may extend, when the jaws 82 are in an axially rearward position.

Figure 9:
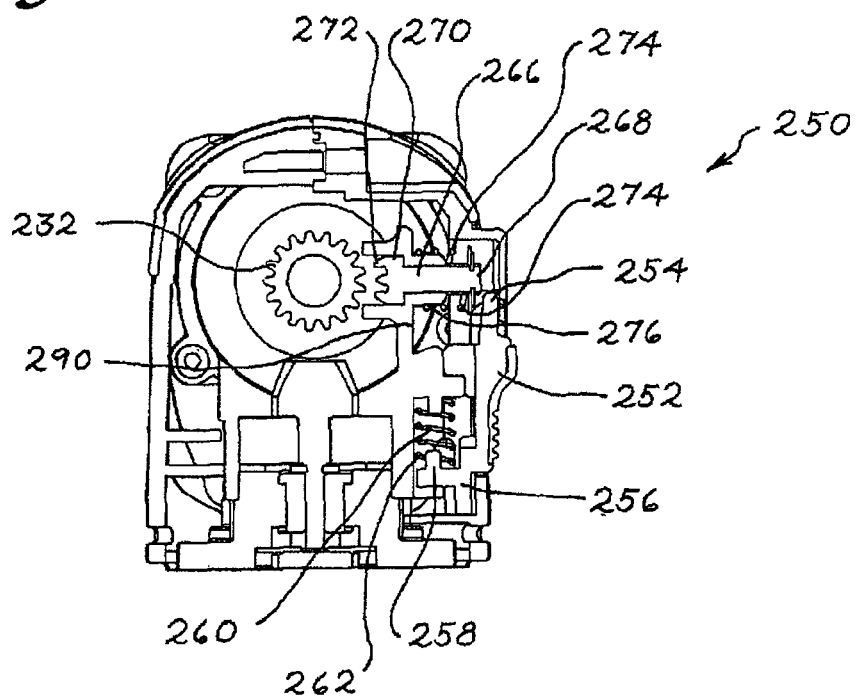
FIG. 9 is a sectional view of the right angle drill of FIG. 8.

Because only a single sleeve is provided, the right angle drill 200 described above, may have a spindle lock mechanism 250. FIG. 9 shows one embodiment of a spindle lock mechanism 250 useful with the chuck assembly 70 of the embodiment of FIG. 8. The spindle lock mechanism 250 includes an actuator 252 that is slidable in a direction perpendicular to a longitudinal axis 72 of the chuck assembly 70. In particular, the actuator 252 includes a first end 254 and a second end 256. The second end of the actuator 256 includes a boss 258 that receives a portion of a biasing mechanism 260 (illustrated as a spring) that will bias the actuator 252 in a non-locking position. In particular, the boss 258 engages a first end 262 of the biasing mechanism 260 and the second end 256 engages a lock shaft 266. In particular, the lock shaft 266 has a first end 268 that is selectively engaged by the first end 254 of the actuator 252 and a second end 270 that engages a portion of the spindle 220. In this regard, the second end 270 of the lock shaft 266 may be provided with teeth 272 that can engage a spindle lock gear 232 provided on the spindle 220. As shown in FIG. 8, the spindle lock gear 232 may be disposed on the spindle 220 between the spindle drive gear 226 and the journal 230. A biasing member 274, shown as a spring in FIG. 9, has one end 276 that contacts a stationary support rib 290 that is part of the right angle gearbox and another end that 278 contacts a portion of the lock shaft 266, in particular a portion of the lock shaft 266 near the first end 268. The biasing member 274 biases the second end 270 of the lock shaft 266 out of engagement with the spindle lock gear 232. While the above spindle lock mechanism 250 described above is suitable, it is to be understood that the spindle lock mechanism can be configured in a variety of different ways and, thus, the spindle lock mechanism described with respect to FIGS. 2 and 3 may be used, as well as other spindle lock mechanisms.

Figure 11:
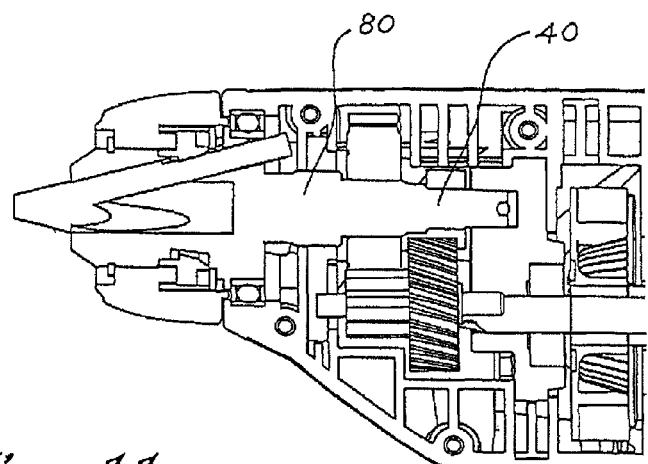
FIG. 11 is a cross sectional view of a chuck assembly according to the present invention where the chuck body has a monolithic tail functioning as the main drive shaft in a drill.

As noted above, the spindle 40, 220 shown in the chuck assembly of FIGS. 2 and 10 and described in connection with FIGS. 1-10 could be replaced by making the spindle 40, 220 monolithic with the tail 80 of the chuck body 74. An example of this arrangement is shown in FIGS. 10-11. There, the chuck body 74 includes a tail 80 axially rearward of the 96 support bearing and extending from the chuck body 74. The tail 80 may function as the spindle 40, 220 described above in all respects except that the tail 80 is monolithic with the chuck body 74.

Figure 12:
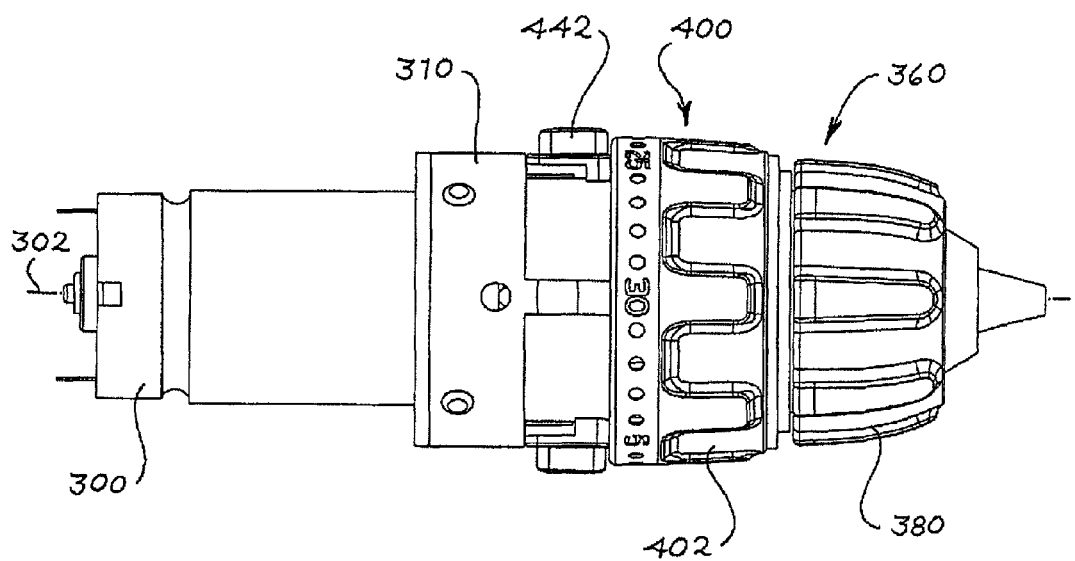
FIG. 12 is a side view of a chuck assembly that incorporates a clutch mechanism and clutch bypass feature.
Figure 13:
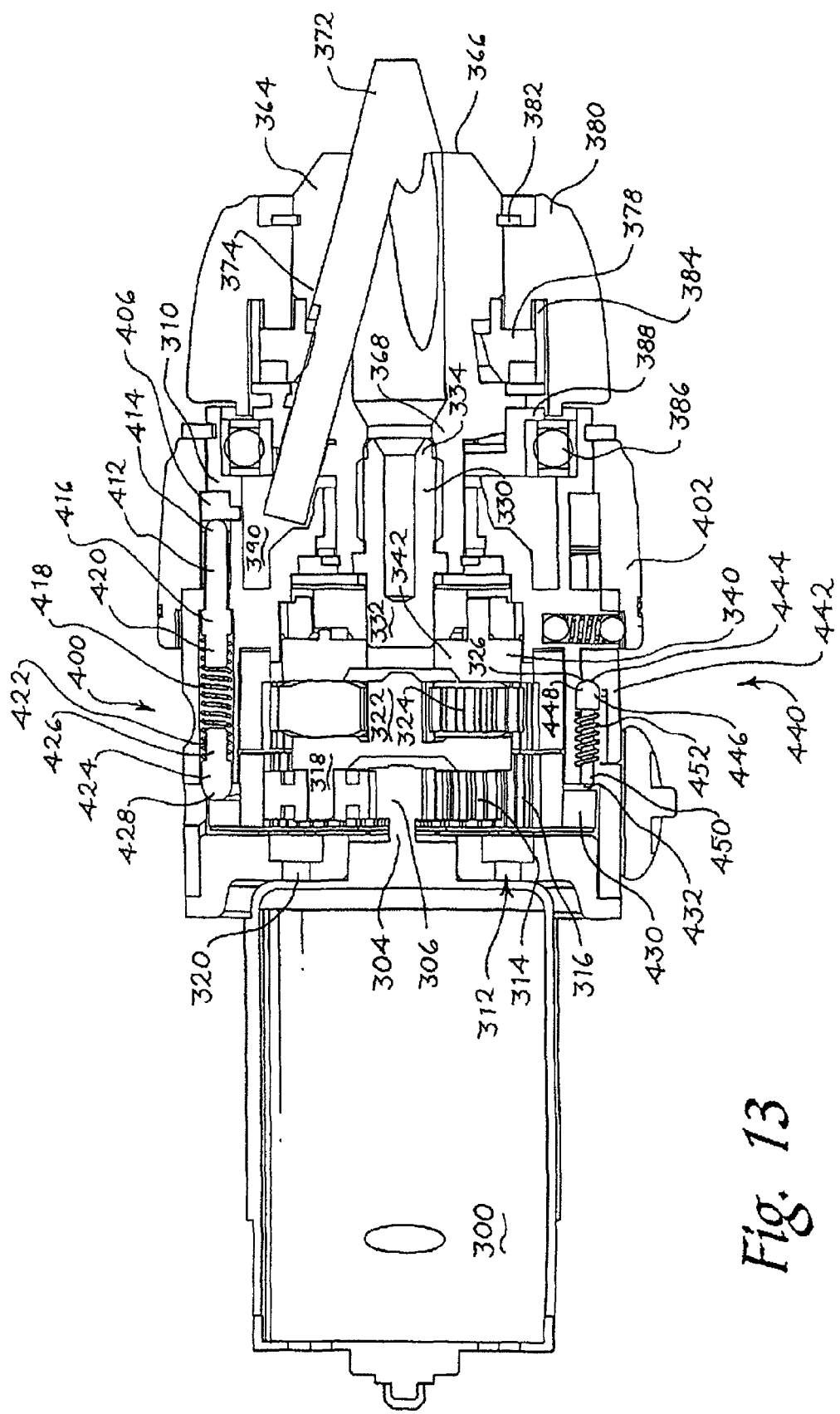
FIG. 13 is a cross sectional view of the chuck assembly of FIG. 12.

Turning now to FIGS. 12 and 13, another embodiment of the chuck assembly is illustrated. In this embodiment, the chuck assembly 360 is associated with a torque adjustment mechanism 400. Referring specifically to FIG. 13, a motor 300 is shown connected to gearing 312 located within a gearbox housing 310. The gearing 312 receives the motor output shaft 304 and through a motor output gear 306 and the gearing 312, causes the chuck body 364 to rotate. A torque adjustment mechanism 400 is provided between the motor 300 and the outer sleeve 380 of the chuck assembly 360. It is believed that the chuck assembly 360 according to the present invention will work with a variety of gearbox arrangements and torque adjustment mechanisms 400. For instance, it is believed that the chuck assembly 360 can be associated with a clutch assembly such as that described in US 2006/0213675, the contents of which are incorporated herein by reference.

In addition, the chuck assembly 360 of this embodiment is shown with an automatic spindle lock mechanism 340. In this regard, it is believed that the spindle lock mechanism described in U.S. Pat. No. 6,702,090, which is incorporated herein by reference, could be used with the chuck assembly 360 according to the present invention.

Turning back to FIG. 13, the chuck assembly 360 includes a chuck body 364 with an axial forward end 366 with an axial opening through which jaws 372 that are capable of gripping the shaft of a work tool extend. The jaws 372 are mounted within bores 374 angularly positioned through the body 364 and equally spaced throughout the body 364. An adjustment ring or nut 378 is mounted within a groove in the body 364 and it includes threads that engage corresponding threads on the jaws 372. As a result, when the adjustment ring or nut 378 rotates with respect to the body 364 the jaws 372 move in a corresponding axially forward or rearward direction. An outer sleeve 380 is rotatably mounted about the body 364 and is axially fixed with respect to the body 364. The outer sleeve 380 may be axially fixed by a ring 388 that is axially fixed to the chuck body 364 yet allows the outer sleeve 380 to rotate with respect to the body 364.

The outer sleeve 380 is operatively connected with the adjustment ring or nut 378 so that rotation of the outer sleeve 380 causes a corresponding rotation of the adjustment ring or nut 378 in the same direction as the rotation of the outer sleeve 380. The outer sleeve 380 may be operatively connected in a variety of known means so long as rotation of the outer sleeve 380 causes rotation of the adjustment ring or nut 378. For example, the outer sleeve 380 may be connected through a nut sleeve 384 engaged by the outer sleeve 380 and fixed to the nut 378.

As noted above, a motor 300 includes an output shaft 304 defining a motor axis 302. The output shaft 304 includes an output gear 306 that rotates with the output shaft 304. The output gear 306 functions as a sun gear and is connected to a first layer of planet gears 314 that rotate about a first ring 316.

The first layer of planet gears 314 are rotatably carried or supported on axial projections 320 on one side of a planet carrier 318 that has an output gear 322 acting as a second layer sun gear on its opposite side. The second layer sun gear 322 engages a second layer of planet gears 324 that are rotatable about a second layer ring gear 326 that is supported within the gearbox housing 310. The second layer planet gears 324 are rotatably carried by, in this instance, a spindle lock carrier 342 of a spindle lock mechanism 340. A suitable spindle lock mechanism is shown and described in U.S. Pat. No. 6,702,090, the contents of which are incorporated herein by reference.

The spindle 330 has a first end 332 and a second end 334. The second end 334 is operatively connected to the rear end or tail 374 of the chuck body 364. As with the other embodiments of the chuck body 364 described above, the chuck body of this embodiment has a support bearing structure 386 press fit onto the rear end 368 of the chuck body 364. The support bearing structure 386 is axially fixed within the gearbox and clutch mechanism housing 310 so that chuck body 364 is axially fixed but rotatably supported. In particular, in this embodiment, a support ring 388 may be fixed to a portion of a thrust ledge 376 and/or a portion of the tail 370 of the chuck body 364. The support ring 388 may then be fixed to the support bearing structure 386 so that the chuck body 364 can rotate with respect to the gearbox and clutch mechanism housing 310. Alternatively, the support ring 388 and chuck body 364 may be integral to provide a single component structure.

An annular space 390 is defined between the support bearing structure 386 on the chuck body 364 and the spindle lock mechanism 340. The annular space 390 is sized to allow the jaws 372 to extend when the jaws 372 are in an axially rearward position. The annular space 390 allows the axial length of the chuck body 364 to be reduced. As a result, the overall length of the drill can be shorter.

As noted above, this embodiment includes a torque adjustment mechanism 400. The torque adjustment mechanism 400 includes an outer torque adjustment sleeve 402 axially fixed but rotatably mounted about the gearbox and torque adjustment mechanism housing 310. Rotation of the outer torque adjustment sleeve 402 in a selected direction increases or decreases the torque limit.

Figure 13A:
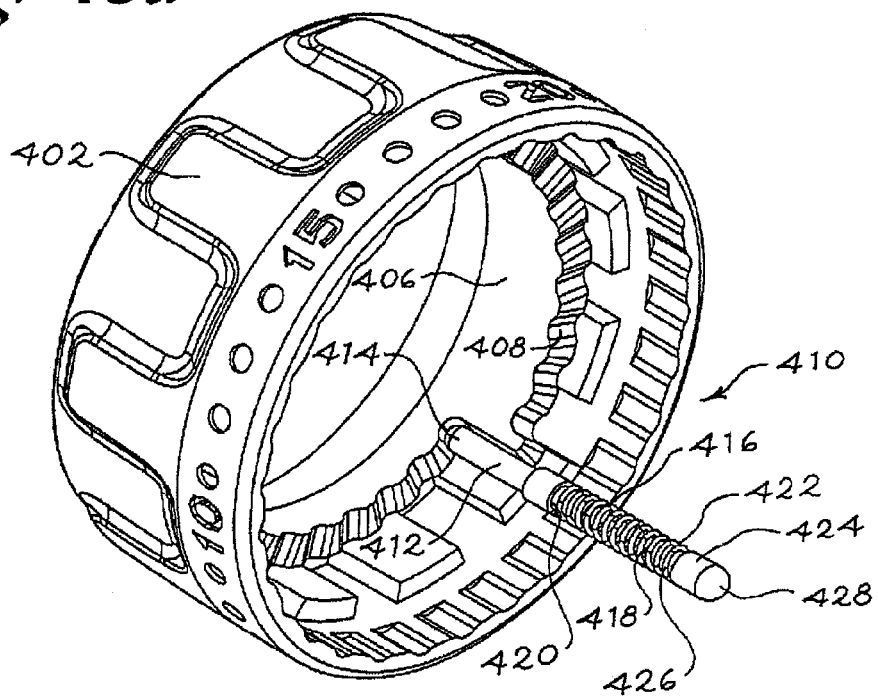
FIG. 13a shows a partial view of a torque adjustment ring shown in the assembly of FIG. 13.

A torque adjustment ring 406 is connected to an inner portion of the outer torque adjustment sleeve 402 such that rotation of the outer torque adjustment sleeve 402 causes rotation of the torque adjustment ring 406. The torque adjustment ring 406 is better shown in FIG. 13*a*. The torque adjustment ring 406 is operatively engaged with a contacting member 410 that contacts a clutch face 432, as explained in more detail below. In particular, the torque adjustment ring 406 includes steps 408 that engage the contacting member 410. The contacting member 410 includes a carrier member 412 that extends axially rearward and is operatively and biasingly connected to a follower member 424, one end of which engages a clutch 430. It can be seen that as the torque adjustment ring 406 is rotated, the carrier member moves from one step to an adjacent step and, depending on the direction of rotation, the carrier member moves in an axially rearward or axially forward direction. The carrier member 412 may be in the form of a pin that has a first end 414 carried by or engaged with the torque adjustment ring 406 and a second end 416 that engages one end 420 of a biasing member 418, shown in FIG. 13 as a coil spring. The other end 422 of the biasing member 418 is connected to one end 426 of the follower member 424. The other end 428 of the follower member 424 engages a clutch face 432 provided on a clutch 430, which is connected to the first ring gear 316. The clutch 430 may be formed as a ring secured to the first ring gear 316 or may be formed as part of the first ring gear 316.

The clutch face 432 in engagement with the other end 428 of the follower member 424 is configured so that resistance to rotation of the first ring gear 316 can be changed upon selective rotation of the outer torque adjustment sleeve 402.

In one embodiment, the clutch face 432 may be ramped or may have several ramps such as in a sinusoidal pattern. Accordingly, as the outer torque adjustment sleeve 402 is rotated to a higher (greater) torque setting, the carrier member 412 is moved in an axially rearward direction causing the biasing member 418 to increase or create more pressure or force on the follower member 424, which is in contact with the clutch face 432 and, in turn, increases the resistance to rotation of the clutch 430 and first ring gear 316.

Figure 15A:
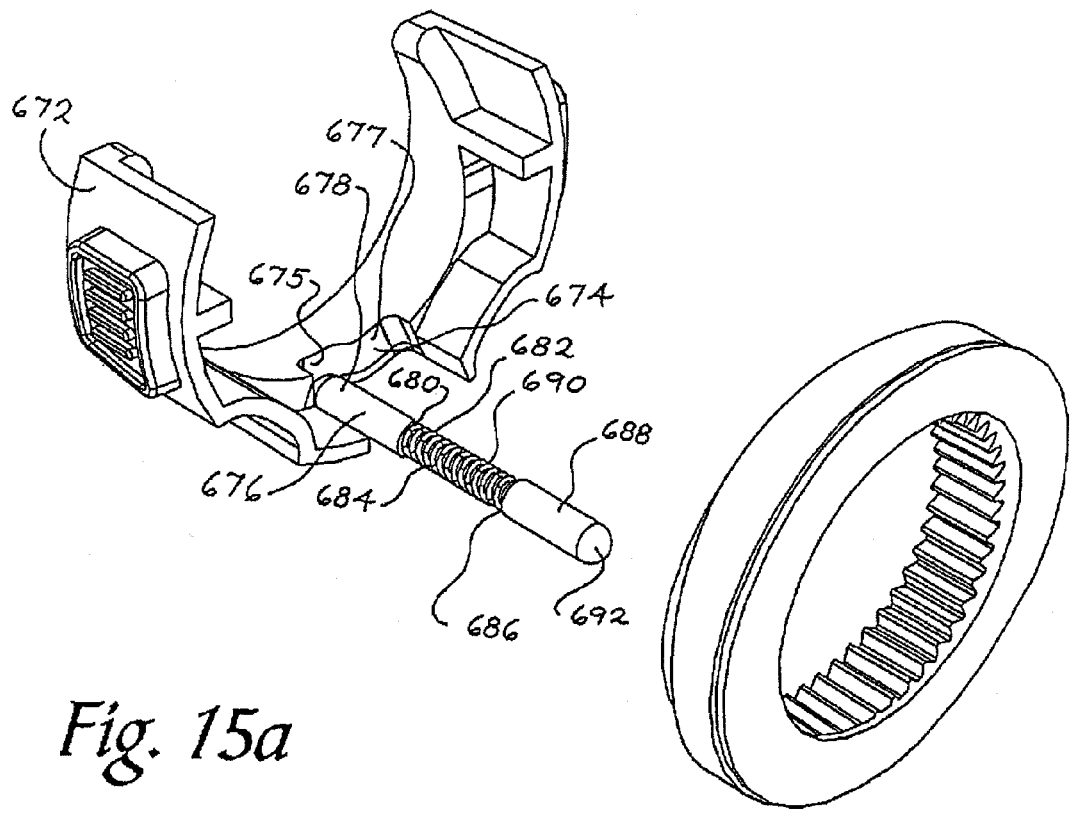
FIG. 15a is a partial view of the torque bypass mechanism shown in FIG. 15.

A torque bypass mechanism 440 may also be provided. One example of a suitable torque bypass mechanism 440 is shown in FIG. 15a. The torque bypass mechanism 440 will operate regardless of the torque setting. The torque bypass mechanism 440 includes an actuator 442 extending from the gearbox housing 310. The actuator 442 as shown in FIG. 13 has an inner surface 444 that engages a carrier member 446 that extends axially rearward to engage the clutch face 432. The actuator 442 may be configured such that as the actuator 442 is moved, the carrier member 446 is moved in an axially rearward direction to contact the clutch face 432 to prevent the clutch 430 and thus the fist ring 316 from rotating. As a result, the motor 300 will drive the spindle 330 and thus the chuck body 364 for sustained rotation without any torque limitation.

Figure 13B:
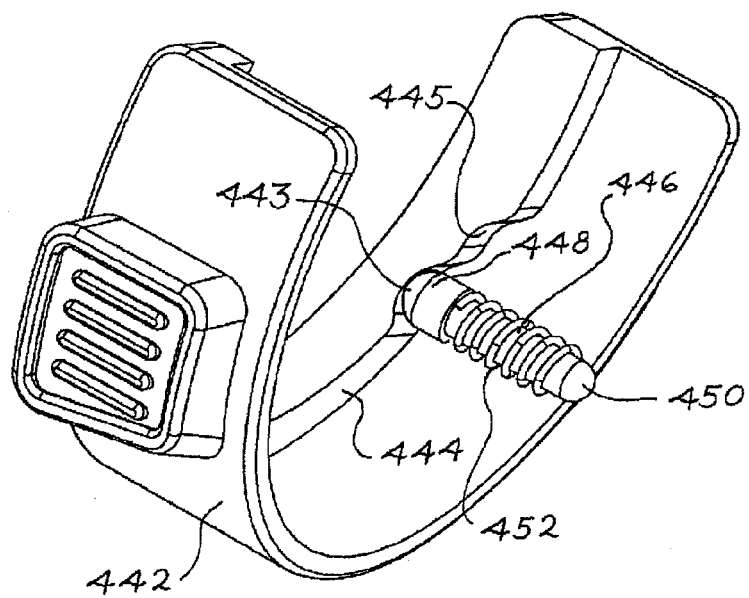
FIG. 13b is a partial view of a torque bypass mechanism shown in the assembly of FIG. 13.

As best seen in FIG. 13b, the inner surface 444 of the actuator 442 may be provided with a first step 443 and a second step 445 so that when the actuator is in a first position, a first end 448 of the carrier member 446 is engaged by the first step 443 and the second end 450 of the carrier member is not in engagement with the clutch face 430. When the actuator is rotated to a second position, the first end 448 of the carrier 446 is engaged by the second step 445 and the second end 450 of the carrier member engages the clutch face 432 to block rotation of the clutch 430.

A biasing member 452 may be provided to assist in returning the carrier member 446 into a position where the end 448 is in contact with the first step 443. As shown in FIG. 13b, the biasing member 452 is shown as a coil spring that is wrapped around the carrier member 446.

Figure 14:
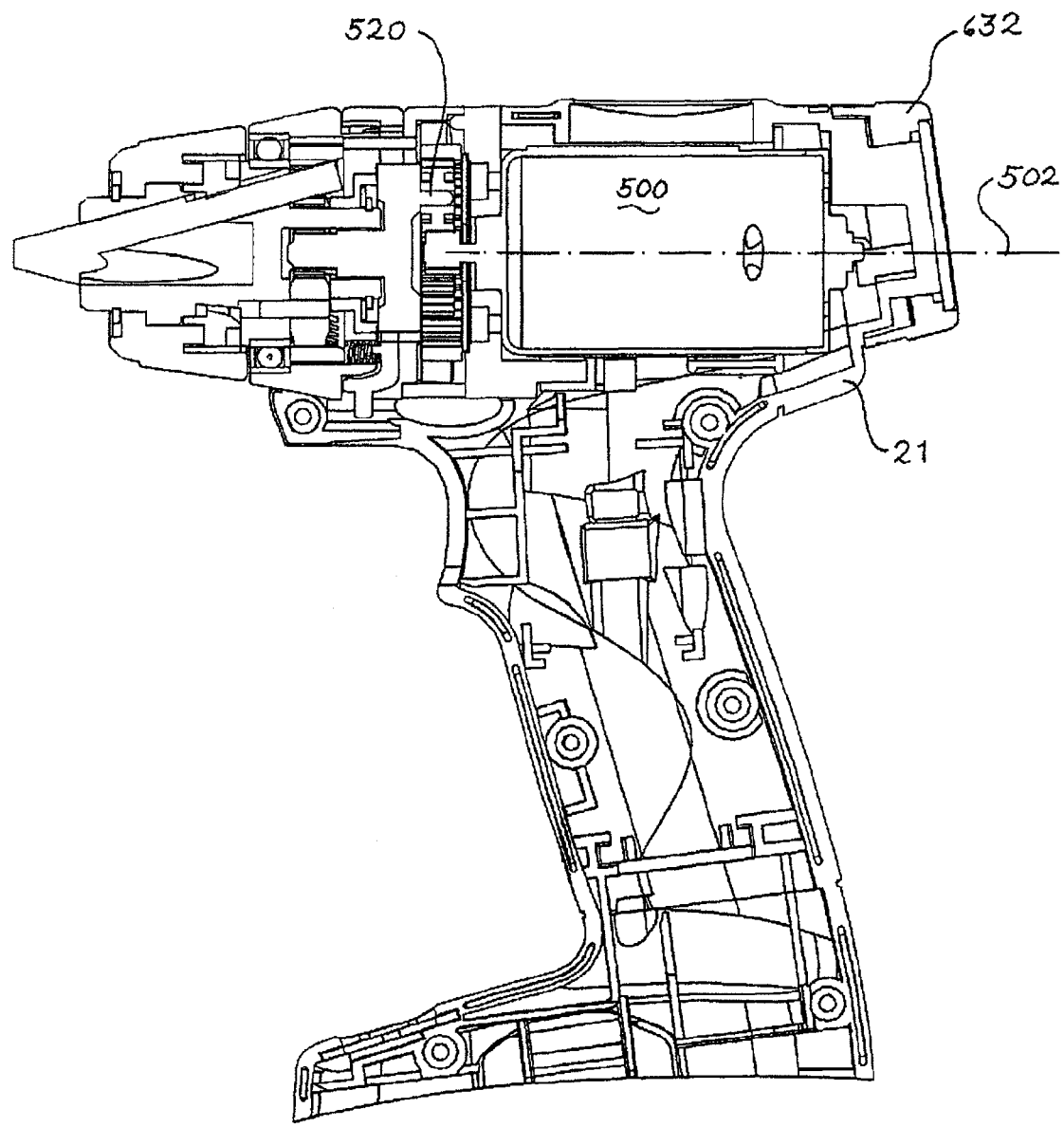
FIG. 14 is a cross sectional view of another embodiment of a chuck assembly according to the present invention where a planetary gear set is incorporated with the chuck body.
Figure 15:
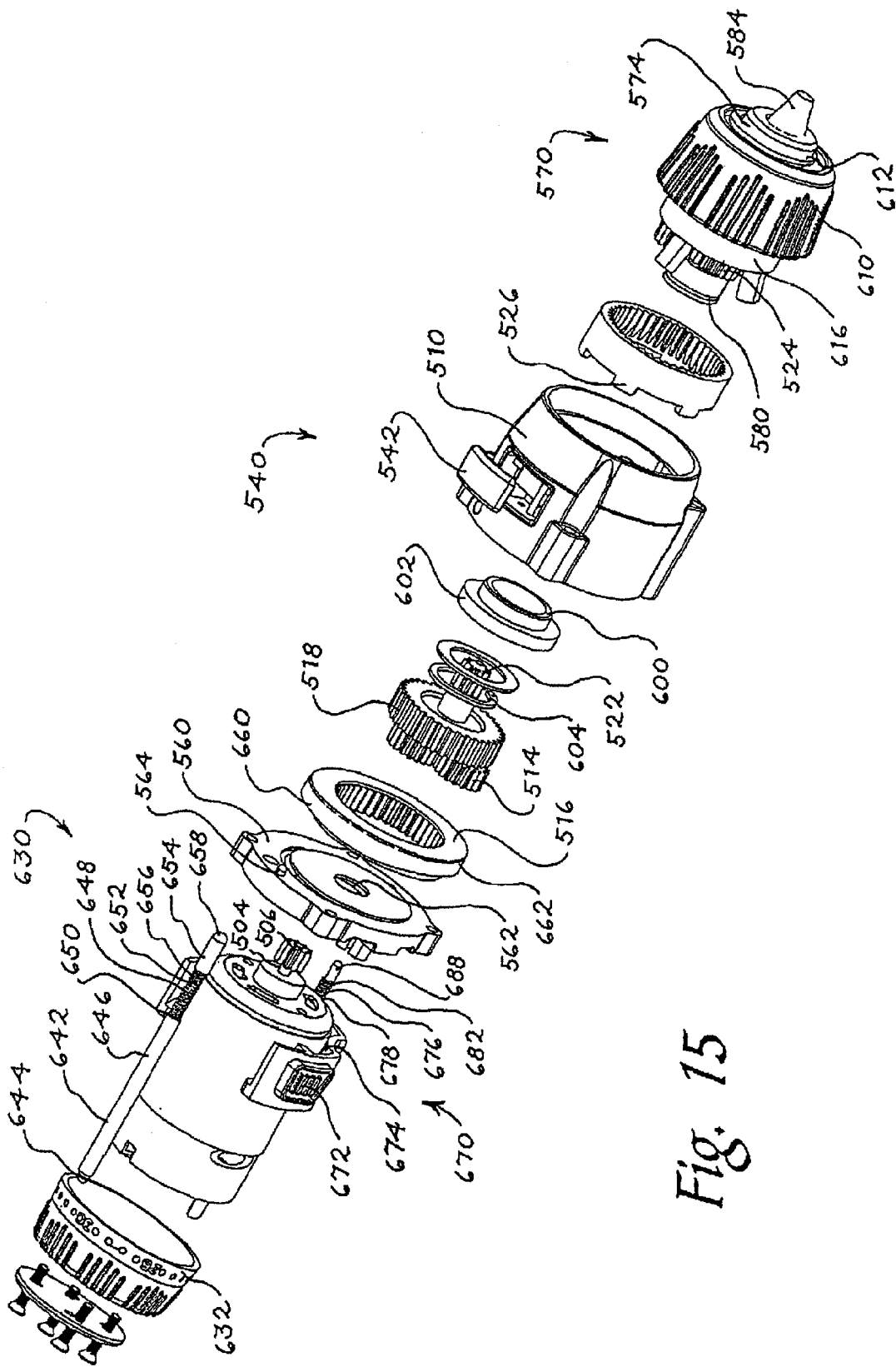
FIG. 15 is an exploded view of chuck assembly, clutch mechanism and gear assembly of FIG. 14.

In another aspect of the invention, the auto spindle lock mechanism 340 described above is replaced with a manual spindle lock mechanism, the output carriers have been moved and integrated with the chuck body, and the torque adjustment assembly has been moved to the rear of the drill housing. Turning now to FIGS. 14 and 15, in this aspect, the tool housing 20 defines a cavity for a motor 500 from which an output shaft 504 that carries an output gear 506 extends in an axial forward direction. A support 560 fixed to the housing is provided with a central aperture 562 from which the motor output shaft 504 extends.

The tool housing 20 has a rear end 21 from which a torque adjustment sleeve 632 is axially fixed but rotatably mounted. An inner surface of the torque adjustment sleeve 632 carries a first end 644 of a carrier member 642 such that, as the torque adjustment sleeve 632 is rotated in a torque increasing direction, the carrier member 642 is moved in an axially forward direction. In one aspect, the inner surface of the torque adjustment 632 sleeve is ramped. In another aspect, a torque adjustment ring is connected to an inner portion of the torque adjustment sleeve such that rotation of the torque adjustment sleeve causes rotation of the torque adjustment ring. In this instance, the torque adjustment ring has a structure such that as it is rotated in one direction, the carrier member 642 is moved axially forward and when it is rotated in another direction, the carrier member 642 is moved axially rearward.

The second end 646 of the carrier member 642 is operatively and biasingly connected to a follower member 654, one end 658 of which engages a clutch face 662. In particular, the carrier member 642 has a first end 644 operatively associated with the torque adjustment sleeve 632 and a second end 646 that engages one end 650 of a biasing member 648, shown in FIG. 15 as a coil spring. The other end 652 of the biasing member 648 is connected to one end 656 of the follower member 654. The follower member 654 extends through a pin hole 564 in the support 560 and the other end 658 of the follower member 654 engages a clutch face 662 on a clutch 660 that is connected to the first ring gear 516. In one aspect, the clutch face 662 may be monolithic with the first ring gear 516.

The clutch face 662 is configured so that resistance to rotation of the first ring gear 516 can be changed upon selective rotation of the torque adjustment sleeve 632. In one embodiment, the clutch face 662 may be ramped or may have several ramps such as in a sinusoidal pattern. Accordingly, as the torque adjustment sleeve 632 is rotated to a higher (greater) torque setting, the carrier member 642 is moved in an axially forward direction causing the biasing member 648 to increase pressure or force on the follower member 654, which is in contact with the clutch face 662 and, in turn, increases the resistance to rotation of the first ring gear 516.

The motor output shaft 504 includes a gear 506 which acts as a sun gear that is connected to a first layer of planet gears 514 that rotate about the first ring 516, described above. The first layer of planet gears 514 are rotatably carried or supported on axial projections 520 on one side of a planet carrier 518. The opposite side of the carrier 518 has an output gear 522 acting as a second layer sun gear. The second layer sun gear 522 engages a layer of planet gears 524 that are carried by the chuck body 574 as described below and that are rotatable about a second layer ring gear 526 that is fixed within the gearbox housing 510.

Figure 16:
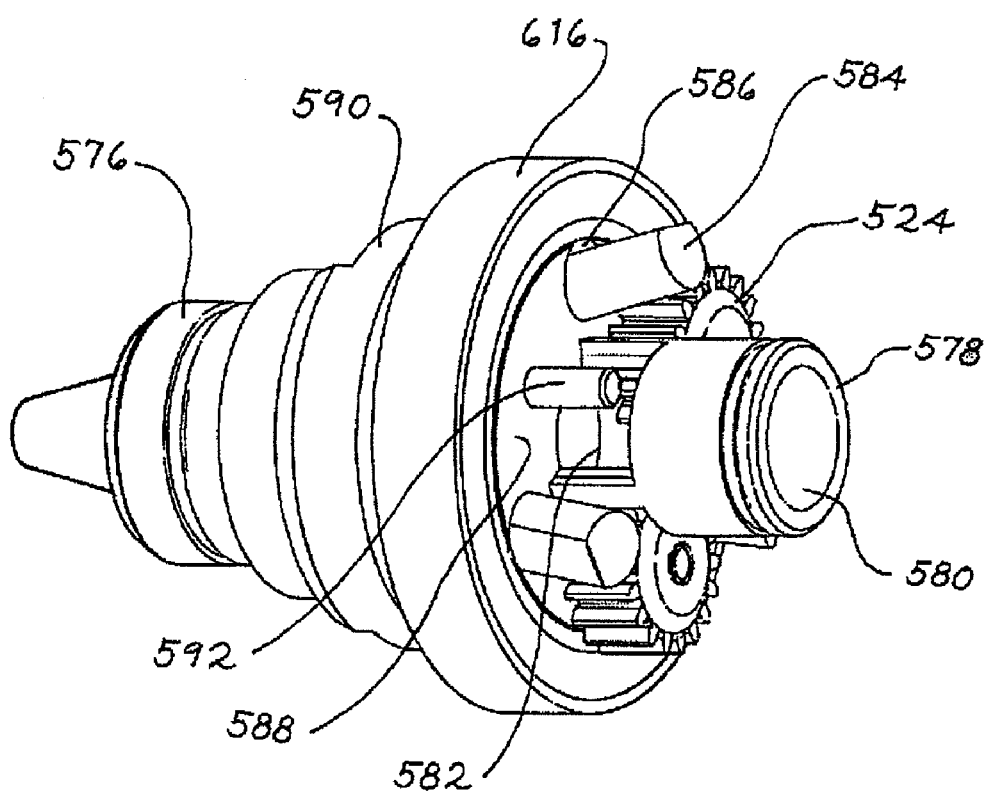
FIG. 16 is a view of a chuck body useful with one aspect of the chuck assembly of FIG. 14.
Figure 17:
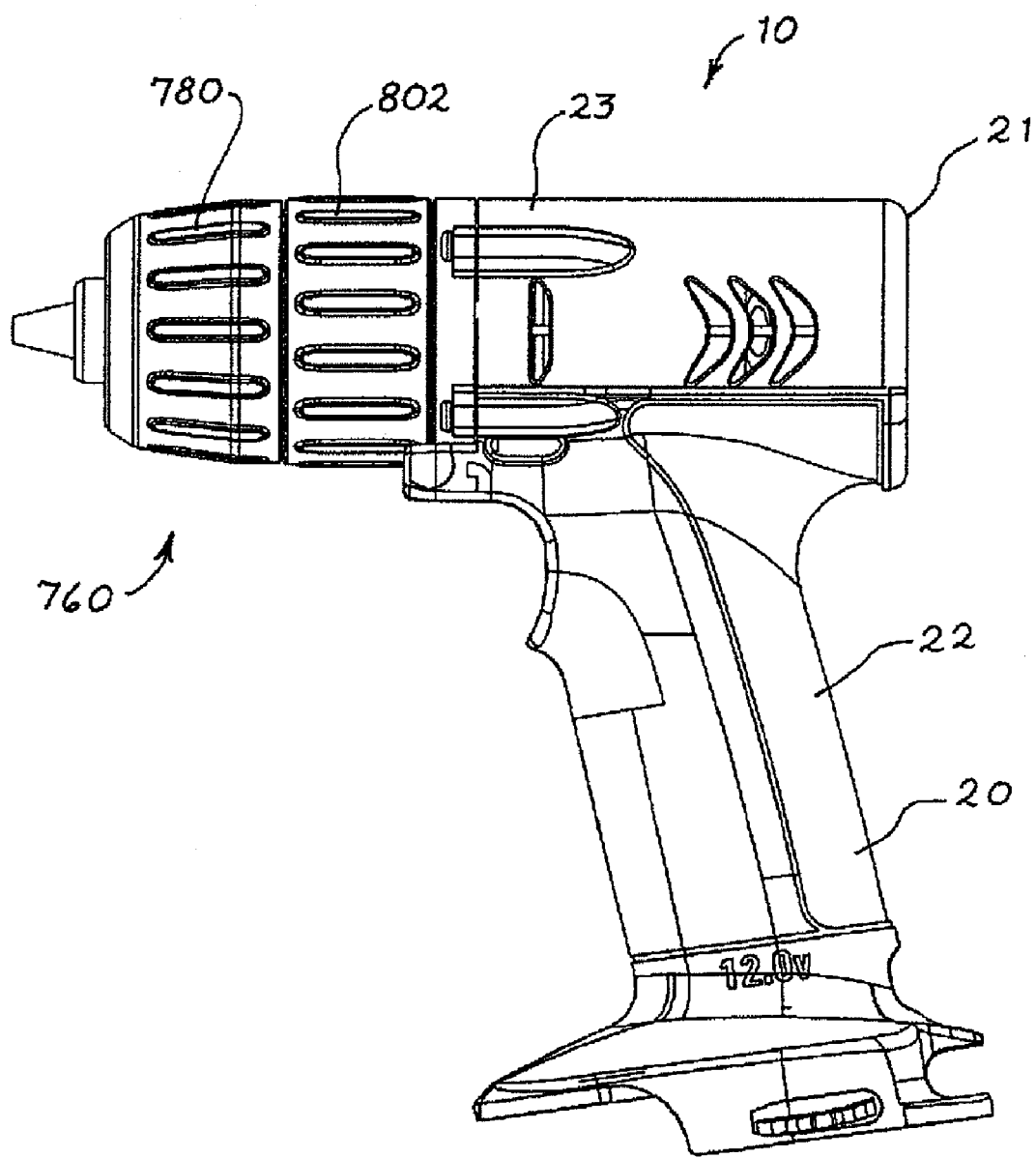
FIG. 17 is a side perspective view of a tool incorporating the chuck assembly of the present invention and which also has an auto spindle lock and torque adjustment mechanism.
Figure 18:
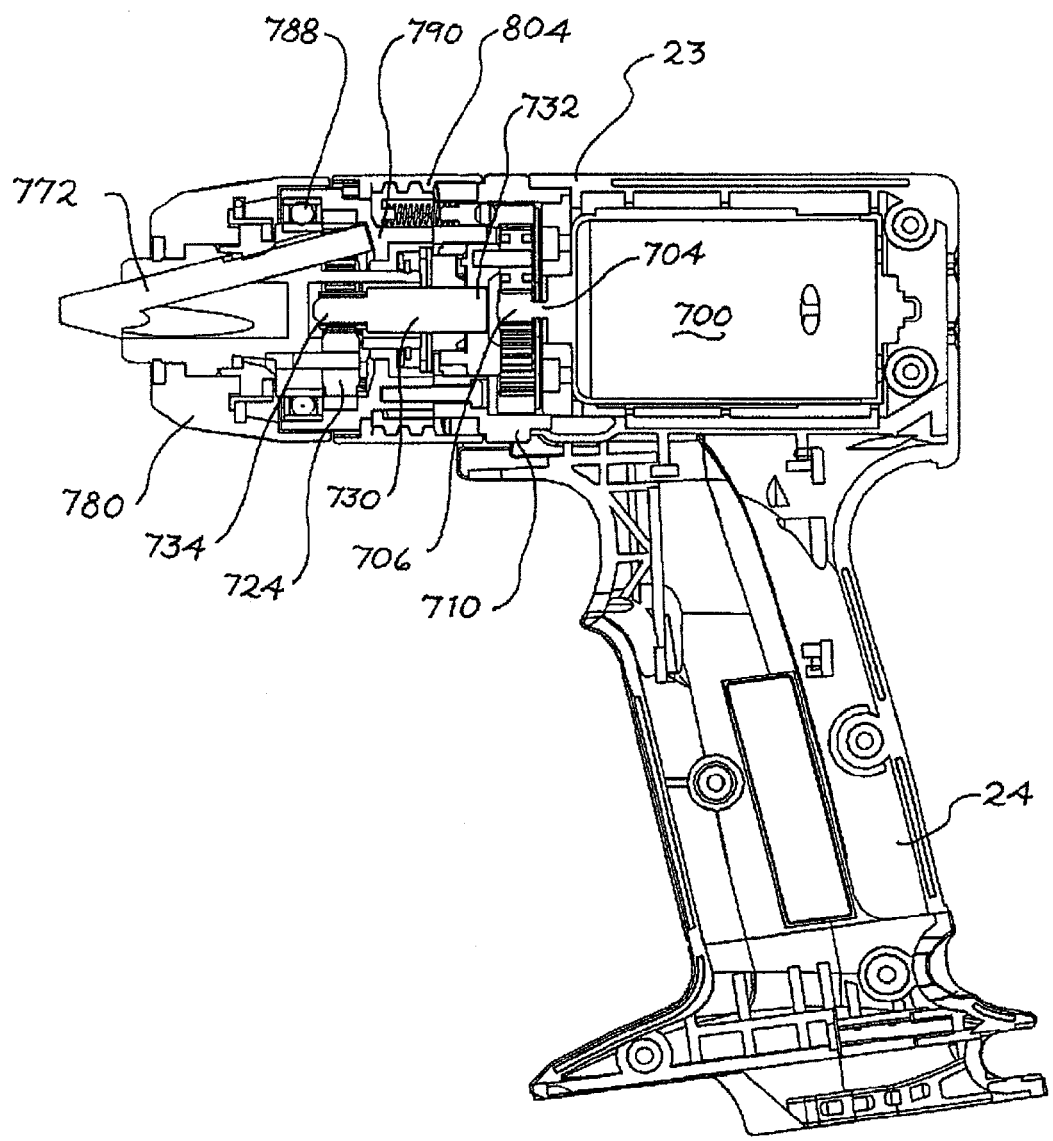
FIG. 18 is a cross section view the tool of FIG. 17.

As better seen in FIG. 16, the chuck body 574 has a front end 576 and a rear end 578. The chuck body 574 has an axial forward end 576 with an axial opening through which jaws 584 that are capable of gripping the shaft of a work tool extend. The jaws 584 are mounted within bores 586 angularly positioned through the body 574 and equally spaced throughout the body. An adjustment ring or nut 590 is mounted within a groove in the body 574 and it includes threads that engage corresponding threads on the jaws 584. As a result, when the adjustment ring or nut 590 rotates with respect to the body 574 the jaws 584 move in a corresponding axially forward or rearward direction. An outer sleeve 610 is rotatably mounted about the body 574 and is axially fixed with respect to the body 574. The outer sleeve 610 is connected to the adjustment ring or nut 590 so that when the outer sleeve 610 is rotated, the adjustment ring or nut 590 is rotated. As with the other embodiments described above, the chuck body has a ledge 588 and the support bearing 616 is fixed to the rear portion of the ledge.

One or more and desirably three pins 592 extend axially rearward from the ledge 588 and respectively carry a second planet gear 524. A tail 580 extends from the ledge 588 and it includes an opening 582 in which a portion of the one or more planet gears 524 can extend. Although FIG. 16 shows a single opening 582, it will be understood that, in this instance, three openings 582 are present to receive a portion of the each of the three planet gears 524. As noted above, the three planet gears 524 are driven by the second layer sun gear 522 and rotate about the second ring gear 526.

Turning back to FIG. 15, a bushing 600 has an outer periphery 602 that is fixed to the inner portion of the gearbox housing 510 and has an inner periphery that surrounds the tail 580 of the chuck body 574 to allow the chuck body 574 to rotate. A C-ring or suitable securing member 604 is provided on the tail 580 of the chuck body 574 to restrain the chuck assembly 570 from forward axial movement.

A torque bypass mechanism 670 may be provided. The torque bypass mechanism 670 will operate regardless of the torque setting. The torque bypass mechanism 670 includes an actuator 672 extending from the housing.

The actuator 672 is best seen in FIG. 15a has an outer surface that extends from the housing and is engageable by the user. The inner portion 674 of the actuator is operatively connected with a carrier member 676 that extends axially forward and is operatively and biasingly connected to a follower member 688, one end 692 of which engages the clutch face 662. In particular, the carrier member 676 has a first end 678 operatively connected to the torque bypass actuator 672 and a second end 680 that engages one end 684 of a biasing member 682, shown in FIG. 15 as a coil spring. The other end 686 of the biasing member 682 is connected to one end 690 of the follower member 688. The other end 692 of the follower member 688 engages the clutch face 662, which is connected to the first ring gear 516. As the clutch bypass actuator 672 is moved or rotated, the force exerted by carrier member 676 and thus the follower member 688 on the clutch face 662, hinders rotation of the fist ring 516. As a result, the motor 500 will drive the output gear 522 and thus the chuck body 574 for sustained rotation without any torque limitation.

Figure 14A:
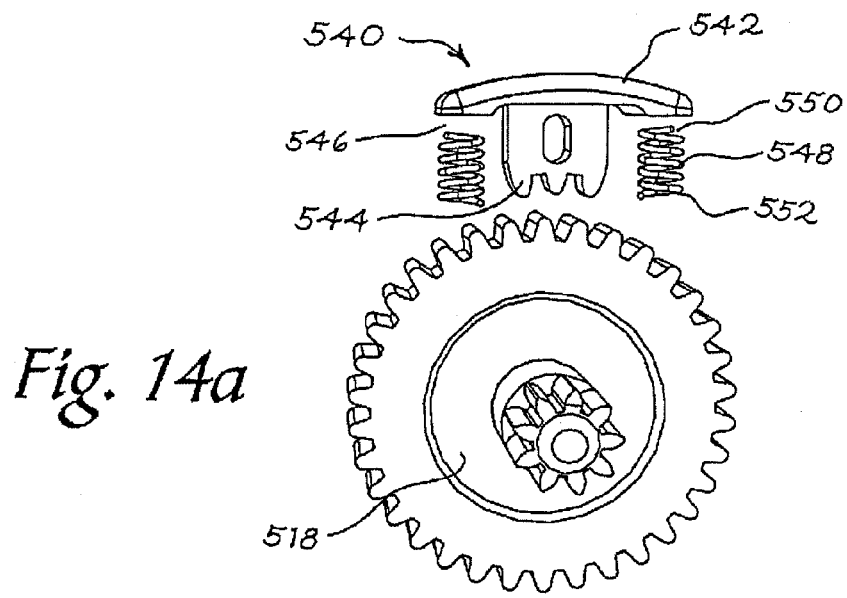
FIG. 14a shows a detail view of the spindle lock.

As noted previously, the chuck assembly 570 can be provided with a spindle lock mechanism 540. FIG. 14a shows a detail view of one embodiment of a spindle lock mechanism 540 useful in the present invention. The spindle lock mechanism 540 includes an actuator 542 accessible through the gearbox housing 510 and having at least one and desirably two legs extending into the housing. A biasing member 548 engages at least a portion of the actuator 542 to bias the actuator out of locking engagement with gearing provided on the peripheral surface of the first layer planet carrier 518. As shown in FIG. 14a, the biasing member 548 includes a spring having one end 550 engaged with a leg 546 of the actuator and the other end 552 engaged with a portion of the gearbox housing 510. The inner portion of the actuator 542 has a pin or teeth 544 that can engage the gearing provided on the peripheral surface of the first layer planet carrier 518 to prevent the sun gear and thus the chuck body 574 from rotating.

Turning now to FIGS. 17-20 another aspect of the present invention is shown. In this aspect, the tool 10 is illustrated as a drill having a housing 20 with a first portion 22 and a second portion 24. The first 22 and second portions 24 define a cavity for the motor 700, which is powered by a source of electricity such as a battery or a cord containing electricity. The drill has a longitudinal axis that is along the motor axis extending generally from the working tip (generally referred to as the forward end) toward a rear end. In the particular embodiment shown in FIG. 17, the tool has a torque adjustment sleeve 802 disposed between the tool housing 20 and the outer sleeve 780 for the chuck body 764. Rotation of the torque adjusting sleeve 802 will adjust the torque to a desired level.

A gearbox housing 710 is mounted to a front end 23 of the housing 20. The gearbox housing 710 is mounted using screws that engage bosses provided on the housing 20 to secure the rear end of the gearbox housing 710 to the front of the tool housing. A support plate 750 is fixed at the rear of the gearbox housing 710 and it contains a central aperture 752 through which the motor output shaft 704 passes. The motor output shaft 704 carries an output gear 706 that engages gearing 712 to drive the chuck body 764. The gearing 712 includes a first layer of planet gears 714 that can rotate about a first layer ring gear 716. The first layer ring gear 716 is rotatably mounted within the gearbox housing 710. The first layer of planet gears 714 are mounted on a carrier 718 through pins 720 to allow the planet gears 714 to rotate.

The carrier 718 connected to one end 732 of a spindle 730 via an automatic spindle lock mechanism. The automatic spindle lock may be constructed in a manner the same as or similar to that described in U.S. Pat. No. 6,702,090, which is incorporated herein by reference.

The second end 734 of the spindle extends toward the chuck body 764 and it has gear teeth 734 that engage planet gears 724 carried by the chuck body 764 and rotating in a second ring gear 726 that is fixed to the gearbox and torque adjustment mechanism housing 710.

The chuck body 764 in this embodiment is similar to that shown in FIG. 16. Accordingly, the chuck body 764 has a front end 766 and a rear end 768. The chuck body 764 has an axial forward end with an axial opening through which jaws 772 that are capable of gripping the shaft of a work tool extend. The jaws 772 are mounted within bores 774 angularly positioned through the body 764 and equally spaced throughout the body 764. An adjustment ring or nut 778 is mounted within a groove in the body 764 and it includes threads that engage corresponding threads on the jaws 772. As a result, when the adjustment ring or nut 778 rotates with respect to the body 764 the jaws 772 move in a corresponding axially forward or rearward direction. An outer sleeve 780 is rotatably mounted about the body 764 and is axially fixed with respect to the body 764. The outer sleeve 780 is connected to the adjustment ring or nut 778 so that when the outer sleeve 780 is rotated, the adjustment ring or nut 778 is rotated. A support bearing 788 abuts the rear portion of the ledge 776 provided on the chuck body 764.

Figure 19:
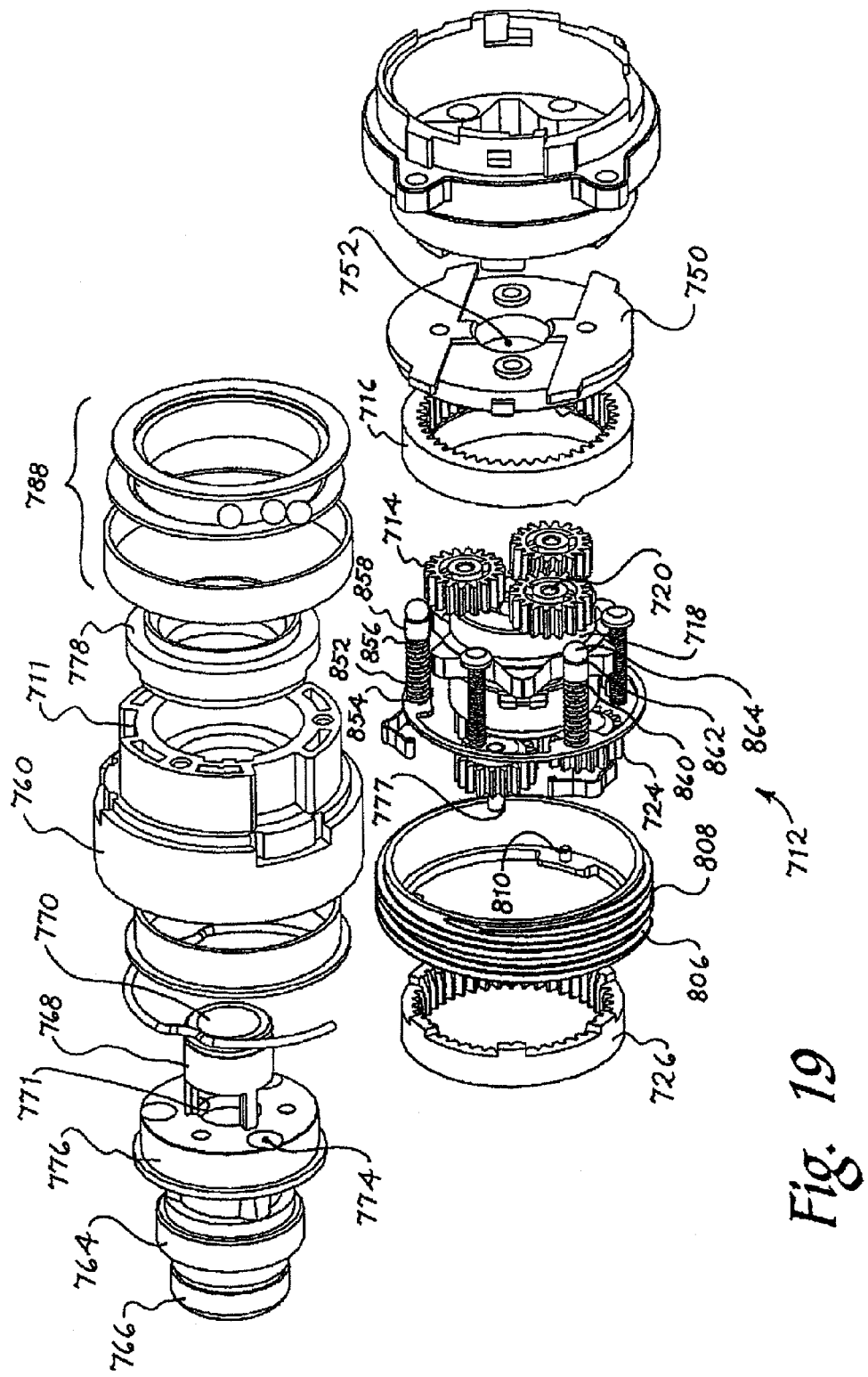
FIG. 19 is an exploded view of the chuck assembly of FIG. 18 from one perspective.
Figure 20:
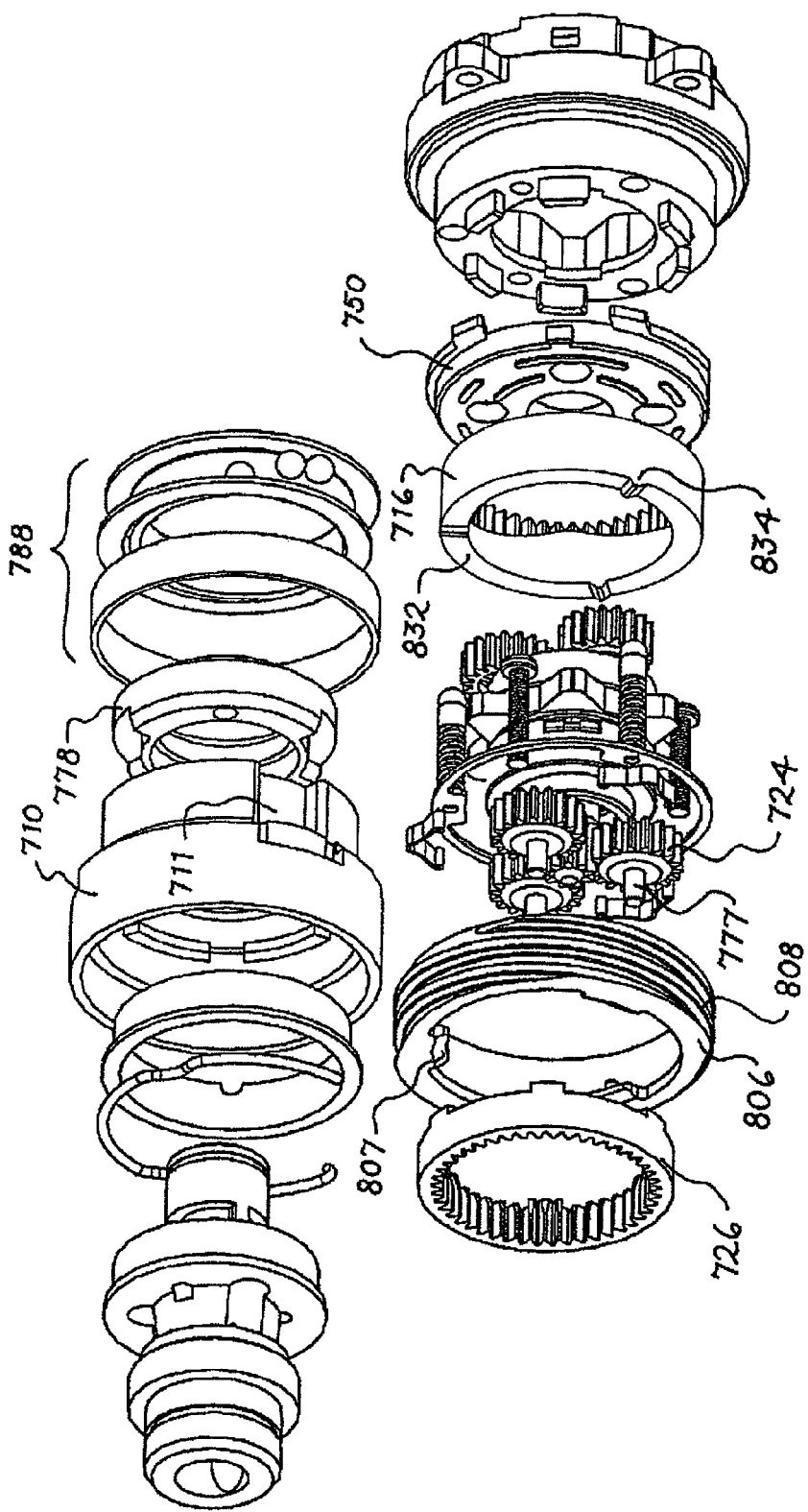
FIG. 20 is an exploded view of the chuck assembly of FIG. 18 from another perspective.

One or more and desirably three pins 777 extend out from the ledge 776 and respectively carry a planet gear 724. The pins 777 may be fixed to the planet gears, as shown in FIG. 19. A tail 770 extends axially rearward from the ledge 776 and it includes an opening 771 in which a portion of the one or more planet gears 724 can extend. Three openings 771 are present to receive a portion of the each of the three planet gears 724. As noted above, the three planet gears 724 are driven by the spindle 730 and rotate about the second ring gear 726.

The gearbox and torque adjustment mechanism housing 710 defines a cavity 790 into which the jaws 772 may extend.

As noted above, the tool 10 of this aspect has a torque adjustment sleeve 802 that forms part of the torque adjustment mechanism 800. The inner surface of the torque adjustment sleeve 802 is formed with threads 804 that interengage threads 808 formed on an outer periphery of a torque adjustment ring 806. In addition, the torque adjustment ring 806 has at least one rib 807 that engages at least one groove 711 provided on the gearbox and torque adjustment mechanism housing 710 so that the torque adjustment ring 806 cannot rotate with respect to the gearbox and torque adjustment mechanism housing 710. Because the torque adjustment sleeve 802 is axially fixed, rotation of the torque adjustment sleeve 802 causes the torque adjustment ring 806 to move in an axial direction depending on the direction of rotation of the torque adjustment sleeve 802. The torque adjustment ring 806 has a boss 810 that engages a first end 854 of a biasing member 852. The second end 856 of the biasing member 852 engages a clutch face contact member 858. As illustrated in the figures, the biasing member 852 is a coil spring and the clutch face contact member 858 is shown as a pin having a first end 860 engaged with the second end 856 of the biasing member 852 and a second end 862 carrying a ball 864. Alternatively, the second end 862 of the clutch face contact member may have a rounded end (i.e., spherical, semi-spherical, or other suitable face to provide slipping resistance on the clutch face as will become clear upon review of the description below). The second end of the clutch face contact member rides on the clutch face 832. As shown in the figures, three clutch face contact members 858 (and associated bosses and biasing members) are provided. It is believed that by providing three contact members 858, the load on each biasing member 852 can be reduced and the clutch operation can be more evenly balanced as compared to the use of only a single contact member. While three contact members 858 are shown, it is contemplated that more or less contact members 858 can be used.

The clutch face 832 is associated with the first layer ring gear 716 and desirably rotates with the first layer ring gear 716. The clutch face 832 may be provided on a face of the first layer ring gear 716. The clutch face 832 has a configuration to provide resistance to rotation as a result of contact by the clutch face contact member 858. For example, the clutch face 832 may be ramped, may be sinusoidal, or may be provided with one or more protrusions 834.

In operation, as the outer torque adjustment sleeve 802 is rotated to a higher torque setting, the torque adjustment ring 806 moves in an axially rearward direction causing the biasing member 852 to compress and exert a greater force on the clutch contact member 858. As a result, when the first layer ring gear 716 rotates to a point where the protrusion 834 contacts the clutch face contact member 858, the contact will provide a resistance to rotation of the first layer ring gear 716. It will be understood that depending on the resistance to rotation of the workpiece and depending on the torque setting, the ring gear 716 may stop spinning.

Turning back to FIG. 18 it can be seen that the outer sleeve 780 extends axially rearward of the support bearing 786. As a result, a portion of the outer sleeve 780 overlies a portion of the gearbox. Advantageously, such an arrangement provides a greater area for the user to grip the chuck sleeve so that it can be rotated for tightening or loosening the jaws.

While the different aspects have been described in connection with certain features and structures, one of skill in the art will understand that each of the various features and structures can be used with each of the embodiments described above even though it is understood that some structural changes may be required. The different combinations are contemplated even though they have not been specifically described above.

The invention claimed is:

1. A tool comprising:
a tool housing containing a motor;
a spindle having a first end and a second end with each end contained within the housing, the spindle being driven by the motor;
a chuck body having an axial forward end, an axial rearward end, a ledge extending radially outward from the chuck body, and a tail extending axially rearward of the ledge, the chuck body being drivably coupled to the first end of the spindle;
a plurality of jaws axially moveable within bores provided in the chuck body; and
a support bearing having an inner periphery fixed to the ledge and having an outer periphery mounted on a housing, wherein when the jaws are in a back position, a rear portion of each of the jaws extends axially rearward of the support bearing and into a cavity defined within the housing.

2. The tool of claim 1 further comprising a nut axially forward of the ledge and that is axially fixed and rotatable with respect to the chuck body such that rotation of the nut causes the jaws to move axially forward or rearward.

3. The tool of claim 2 further comprising an outer sleeve axially fixed with respect to the body and connected to the nut such that rotation of the sleeve causes rotation of the nut.

4. The tool of claim 3 wherein the outer sleeve extends axially rearward such that the rear portion of the outer sleeve is axially forward of the support bearing.

5. The tool of claim 3 wherein the outer sleeve extends axially rearward such that the rear portion of the outer sleeve is axially rearward of the support bearing.

6. The tool of claim 1 wherein the housing forms a portion of the tool housing.

7. The tool of claim 1 wherein the housing forms a portion of a gear box housing.

8. The tool of claim 1 further comprising a spindle lock wherein actuation of the spindle lock secures the chuck body from rotation with respect to the housing.

9. The tool of claim 8 further comprising a lock gear extending radially from and fixed to the spindle wherein the lock gear is engaged by the spindle lock.

10. The tool of claim 1 which is a drill.

11. The tool of claim 1 which is a right angle drill.

12. The tool of claim 1 further comprising a torque adjustment mechanism located generally axially between the motor and the chuck body to selectively limit a torque from the motor to the chuck body.

13. The tool of claim 12 further comprising a torque override mechanism operable in any setting of the torque adjustment mechanism and when actuated does not limit torque from the motor to the chuck body.

14. The tool of claim 1 further comprising a torque adjustment mechanism located axially rearward of the motor to selectively limit a torque from the motor to the chuck body.

15. The tool of claim 1 further comprising pins extending axially rearward from the chuck body ledge and carrying planet gears drivingly engaged with the first end of the spindle.

16. The tool of claim 15 wherein the outer periphery of the support bearing is mounted on a gearbox housing, and wherein the cavity is annular and is defined between the tail of the chuck body and the gearbox housing in which the jaws protrude when in the back position.

17. A drill comprising: a drill housing having a motor output defining a motor output end; a gearbox housing containing gearing coupled to the motor output; and a chuck assembly having a chuck body selectively rotated by the gearing and further having an adjustment ring and an outer sleeve that is rotatably mounted about the chuck body and is rotatably fixed to the adjustment ring, wherein the outer sleeve extends axially rearwardly to overlap an axial front portion of the gearbox housing.

18. A drill comprising:
a motor driving a first output gear drivingly engaged with a plurality of planet gears rotatable around a ring gear;
a carrier having pins carrying the planet gears and having a second output gear;
a chuck body having an axial forward end, an axial rearward end, a ledge extending radially outward from the chuck body, and a tail extending axially rearward of the ledge, the chuck body being drivably coupled to the second output gear;

a plurality of jaws axially moveable within bores provided in the chuck body;

a support bearing having an inner periphery fixed to the ledge and having an outer periphery mounted on a housing, wherein when the jaws are in a back position, a rear portion of the jaws extend axially rearward of the support bearing and into a cavity defined within the housing; and a torque adjustment mechanism including a torque adjustment ring operatively engaged with a torque control member that has a portion contacting a clutch that is operatively associated with the ring gear.

19. The drill of claim 18 further comprising a torque bypass mechanism operable in any setting of the torque adjustment mechanism and when actuated does not limit torque from the motor to the chuck body.

20. A tool comprising:
a motor with an output gear;
a spindle driven by the motor and having an output end;
a chuck body having an axial forward end, an axial rearward end, a plurality of bores in each of which a respective jaw is axially moveable, and a ledge located between the axial forward and rearward ends from which a plurality of pins extend in an axially rearward direction;

an annular formation on which a ring gear is mounted; and a planet gear mounted on a respective pin for rotation within the ring gear and drivingly rotated by the spindle output end, wherein rotation of the spindle causes rotation of the chuck body.

21. A tool comprising:
a tool housing containing a motor;
a spindle having a first end and a second end with each end contained within the housing, the spindle being driven by the motor;
a chuck body having an axial forward end, an axial rearward end, a ledge extending radially outward from the chuck body, and a tail extending axially rearward of the ledge, the chuck body being drivably coupled to the first end of the spindle;
a plurality of jaws axially moveable within bores provided in the chuck body;
a support bearing having an inner periphery fixed to the ledge and having an outer periphery mounted on a housing, wherein when the jaws are in a back position, a rear portion of each of the jaws extends axially rearward of the support bearing and into a cavity defined within the housing; and
a plurality of pins extending axially rearward from the chuck body ledge and carrying planet gears drivingly engaged with the first end of the spindle.

* * * * *